(12) United States Patent
Tsunooka

(10) Patent No.: US 8,474,437 B2
(45) Date of Patent: Jul. 2, 2013

(54) FUEL INJECTION CONTROLLING APPARATUS OF INTERNAL COMBUSTION ENGINE

(75) Inventor: Takashi Tsunooka, Gotenba (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 282 days.

(21) Appl. No.: 12/673,936

(22) PCT Filed: Aug. 20, 2008

(86) PCT No.: PCT/JP2008/064816
§ 371 (c)(1),
(2), (4) Date: Feb. 18, 2010

(87) PCT Pub. No.: WO2009/025293
PCT Pub. Date: Feb. 26, 2009

(65) Prior Publication Data
US 2010/0199953 A1  Aug. 12, 2010

(30) Foreign Application Priority Data

Aug. 21, 2007 (JP) ................. 2007-214292
Aug. 27, 2007 (JP) ................. 2007-220171

(51) Int. Cl.
*F02M 51/00* (2006.01)
*B05B 1/24* (2006.01)
*B05C 1/00* (2006.01)
*F16K 49/00* (2006.01)
*F16L 53/00* (2006.01)

(52) U.S. Cl.
USPC ............ 123/491; 239/135; 137/334

(58) Field of Classification Search
USPC ............ 239/135; 137/334; 123/557, 558, 123/543, 179.3, 491
See application file for complete search history.

(56) References Cited

U.S. PATENT DOCUMENTS

| 4,338,906 A * | 7/1982 | Cox ........................ 123/545 |
| 4,342,303 A * | 8/1982 | McCord ................... 123/557 |
| 4,503,833 A * | 3/1985 | Yunick ..................... 123/545 |
| 4,998,518 A   | 3/1991 | Mitsumoto |
| 5,038,730 A * | 8/1991 | Kashima ................. 123/179.21 |

(Continued)

FOREIGN PATENT DOCUMENTS

| DE | 102005036952 A1 | 2/2007 |
| DE | 60120593 T2 | 6/2007 |

(Continued)

OTHER PUBLICATIONS

International Search Report issued in International Application No. PCT/JP2008/064816; Mailed Nov. 4, 2008.

(Continued)

*Primary Examiner* — Stephen K Cronin
*Assistant Examiner* — Sherman Manley
(74) *Attorney, Agent, or Firm* — Oliff & Berridge, PLC

(57) ABSTRACT

A fuel injection controlling apparatus (electronic control unit) of an internal combustion engine, which can cause first to fourth fuel injection valves of respective cylinders connected to a fuel delivery pipe to inject a fuel, which is heated after fed from a fuel pump (feed pump), is provided with a fuel pump control unit that stops a drive of the fuel pump (feed pump) until the heated fuel in the fuel delivery pipe is reduced to a predetermined amount or less.

13 Claims, 13 Drawing Sheets

U.S. PATENT DOCUMENTS

| | | | |
|---|---|---|---|
| 5,402,763 A * | 4/1995 | Saito et al. | 123/491 |
| 5,546,920 A * | 8/1996 | Johansson | 123/685 |
| 6,065,455 A * | 5/2000 | McLean | 123/557 |
| 6,647,948 B2 | 11/2003 | Kyuuma et al. | |
| 7,263,959 B2 * | 9/2007 | Kataoka et al. | 123/179.4 |
| 7,415,975 B2 * | 8/2008 | Lerner | 123/557 |
| 7,669,585 B2 | 3/2010 | Haag et al. | |
| 8,006,671 B2 * | 8/2011 | Maeda et al. | 123/491 |
| 2002/0046729 A1 | 4/2002 | Kyuuma et al. | |
| 2005/0205038 A1* | 9/2005 | Lewis et al. | 123/179.18 |
| 2005/0214127 A1* | 9/2005 | Scanderbeg et al. | 417/12 |
| 2006/0048734 A1 | 3/2006 | Kataoka et al. | |
| 2007/0233357 A1 | 10/2007 | Sugai et al. | |
| 2008/0251605 A1 | 10/2008 | Haag et al. | |

FOREIGN PATENT DOCUMENTS

| | | |
|---|---|---|
| DE | 602004012838 T2 | 5/2009 |
| EP | 1199460 B1 | 6/2006 |
| EP | 1588047 B1 | 4/2008 |
| JP | A-2-305335 | 12/1990 |
| JP | A-4-231667 | 8/1992 |
| JP | A-5-26087 | 2/1993 |
| JP | A-5-149169 | 6/1993 |
| JP | A-5-209579 | 8/1993 |
| JP | A-8-277734 | 10/1996 |
| JP | A-8-338339 | 12/1996 |
| JP | A-9-273459 | 10/1997 |
| JP | A-2004-84599 | 3/2004 |
| JP | A-2004-263569 | 9/2004 |
| JP | A-2005-264945 | 9/2005 |
| JP | A-2005-299422 | 10/2005 |
| JP | A-2008-215226 | 9/2006 |
| WO | WO 2006/082954 A1 | 8/2006 |
| WO | WO 2007/030906 A2 | 3/2007 |
| WO | WO 2009/054885 A1 | 4/2009 |

OTHER PUBLICATIONS

Japanese Office Action issued in Japanese Patent Application No. 2007-220171, dated Jun. 8, 2010 (with English translation).

* cited by examiner

BEFORE INJECTION STARTS

FIRST FUEL INJECTION CYLINDER INJECTION STARTS

BEFORE INJECTION STARTS

FIRST FUEL INJECTION CYLINDER    INJECTION STARTS

FIRST FUEL INJECTION CYLINDER  INJECTION ENDS

FIRST FUEL INJECTION CYLINDER  INJECTION ENDS

SET START FUEL INJECTION VALVE: FOURTH FUEL INJECTION VALVE

FOURTH FUEL INJECTION VALVE INJECTION STARTS

FUEL INJECTION CONTROLLING APPARATUS OF INTERNAL COMBUSTION ENGINE

TECHNICAL FIELD

The invention relates to a fuel injection controlling apparatus of an internal combustion engine capable of heating fuel before it is injected.

BACKGROUND ART

Recently, in automotive industries, various approaches are executed to cope with a change of environment surrounding automobiles. For example, in a field of internal combustion engines, an approach is executed to a so-called multi-fuel internal combustion engine capable of being operated even using a fuel having a different fuel property. A vehicle, on which this type of the multi-fuel internal combustion engine is mounted, is generally called a flexible fuel vehicle (FFV). There is known, as an example of the multi-fuel internal combustion engine, a vehicle which can be operated making use of any of a gasoline fuel, an alcohol fuel, and a mixed fuel of them to improve an environment performance such as consumption suppression of fossil fuels such as the gasoline fuel and the like whose reserves are said to have reached a limit. For example, the following patent document 1 discloses a multi-fuel internal combustion engine operated using an alcohol-mixed fuel composed of a gasoline fuel and an alcohol fuel.

Incidentally, since evaporation characteristics of the alcohol fuel are generally inferior to those of the gasoline fuel (that is, the alcohol fuel has a larger amount of evaporation latent heat), when an engine is started at a low temperature in a state where an external temperature, an engine cooling water temperature, and an engine lubricant temperature are low, a higher alcohol concentration more deteriorates a start property. Accordingly, there is conventionally known a technique for improving evaporation characteristics by heating a fuel by a heating means such as heater and the like before it is injected to thereby improve a low temperature start property. The following patent document 2, for example, discloses such technique.

Note that the following patent document 3 discloses a technique for controlling a stop position of a piston. The technique described in the patent document 3 includes a technique for fixing an engine speed by applying a driving force of a motor generator to a crank shaft after a fuel is cut and stopping a crank angle at an optimum crank angle stop position making use of inertia energy at the time. Further, there are techniques disclosed in the following patent documents 4 to 6 as techniques belonging to the technical field.

Patent Document 1: Japanese Patent Application Laid-open No. 2-305335
Patent Document 2: Japanese Patent Application Laid-open No. 5-209579
Patent Document 3: Japanese Patent Application Laid-open No. 2004-263569
Patent Document 4: Japanese Patent Application Laid-open No. 5-26087
Patent Document 5: Japanese Patent Application Laid-open No. 8-277734
Patent Document 6: Japanese Patent Application Laid-open No. 4-231667

DISCLOSURE OF THE INVENTION

Problems to be Solved by the Invention

In the technique for improving the low temperature start property by heating the fuel, as the fuel is injected, a low temperature fuel upstream of a heating means (that is, fuel tank side) is fed to a fuel injection valve side before it is heated by the heating means. Accordingly, in the technique, since the fuel previously heated by the heating means is mixed with the low temperature fuel on a fuel supply path and reduces its temperature and thus the evaporation characteristics of the fuel which are improved once are reduced again, the low temperature start property cannot be improved.

Accordingly, an object of the invention is to improve disadvantages of the conventional examples and to provide a fuel injection controlling apparatus of an internal combustion engine capable of making an effect of improvement of a low temperature start property, which is achieved by a heated fuel, effective.

Means for Solving Problem

In order to achieve the object, in the invention described in claim 1, a fuel injection controlling apparatus of an internal combustion engine capable of causing fuel injection valves of respective cylinders connected to a fuel delivery pipe to inject a fuel which is heated after fed from a fuel pump, the apparatus includes a fuel pump control means that stops a drive of the fuel pump until the heated fuel in the fuel delivery pipe is reduced to a predetermined amount or less.

In the fuel injection controlling apparatus of the internal combustion engine according to claim 1, only the heated fuel can be injected by stopping a supply of a non-heated fuel into the fuel delivery pipe.

In order to achieve the object, in the invention described in claim 2, a fuel injection controlling apparatus of an internal combustion engine capable of causing fuel injection valves of respective cylinders connected to a fuel delivery pipe to inject a fuel which is heated after fed from a fuel pump, the apparatus includes a first fuel injection cylinder specifying means that specifies a first fuel injection cylinder to which a fuel is supplied first when the engine starts; and a fuel pump control means that controls a fuel feed amount of the fuel pump according to the specified first fuel injection cylinder.

As in, for example, the invention according to claim 3, the fuel injection controlling apparatus of the internal combustion engine according to claim 2 may be provided with a non-heated fuel injection valve specifying means that specifies a fuel injection valve from which a non-heated fuel supplied into the fuel delivery pipe is injected, based on the first fuel injection cylinder and on an injection sequence of the respective fuel injection valves. The fuel pump control means may more reduce a fuel feed amount of the fuel pump as an injection timing of a non-heated fuel injected by the specified fuel injection valve is reached earlier.

With this arrangement, the fuel injection controlling apparatus of the internal combustion engine according to claims 2, 3 can inject only the heated fuel by reducing a feed amount of the non-heated fuel into the fuel delivery pipe according to the first fuel injection cylinder. Further, a negative pressure is generated in the fuel delivery pipe by stopping the supply of the non-heated fuel and the non-heated fuel is supplied into the fuel delivery pipe as the negative pressure increases regardless that this is not intended. However, since the fuel injection controlling apparatus supplies the non-heated fuel into the fuel delivery pipe in an amount according to the first fuel injection cylinder, the fuel injection controlling apparatus can suppress the increase of the negative pressure.

In order to achieve the object, in the invention described in claim 4, a fuel injection controlling apparatus of an internal combustion engine capable of causing fuel injection valves of respective cylinders connected to a fuel delivery pipe to inject a fuel which is heated after fed from a fuel pump, the apparatus includes a start fuel injection valve setting means that sets a start fuel injection valve suitable for improving a low temperature start property from the respective fuel injection valves; and a fuel injection control means that executes a control so that a fuel injection is started from the set start fuel injection valve.

Since the fuel injection controlling apparatus of the internal combustion engine according to claim 4 can execute a fuel injection using a start fuel injection valve as a start point at a low temperature start, a low temperature start property is improved.

As in, for example, the invention according to claim 5, when a fuel injection timing of a different fuel injection valve is reached earlier than the set start fuel injection valve at a low temperature start, the fuel injection control means may prohibit a fuel injection operation of the different fuel injection valve whose fuel injection timing is reached earlier. With this operation, the fuel injection controlling apparatus of the internal combustion engine according to claim 5 can start a fuel injection from the set start fuel injection valve.

In order to achieve the object, in the invention described in claim 6, a fuel injection controlling apparatus of an internal combustion engine capable of causing fuel injection valves of respective cylinders connected to a fuel delivery pipe to inject a fuel which is heated after fed from a fuel pump, the apparatus includes an engine stop control means that controls, when the engine stops, a stop position of a piston of a cylinder according to a start fuel injection valve suitable for improving a low temperature start property so that the cylinder starts in a suction stroke when the engine starts.

Since the fuel injection controlling apparatus of the internal combustion engine according to claim 6 can execute a fuel injection using a start fuel injection valve as a start point at the low temperature start as with the fuel injection controlling apparatus of the internal combustion engine according to claim 4, the low temperature start property is improved.

Here, the start fuel injection valve may be set according to a minimum necessary number of times of ignition of the heated fuel which is necessary to stably start the internal combustion engine at a low temperature start. That is, it is sufficient to set a fuel injection valve which can be operated by a fuel heated as many times as at least a number of times of its ignition as the start fuel injection valve. For example, as in the invention according to claim 8, a fuel injection valve disposed near to a fuel supply port from the fuel pump in the fuel delivery pipe may be set as the start fuel injection valve.

EFFECT OF THE INVENTION

The fuel injection controlling apparatus of the internal combustion engine according to the present invention can operate the internal combustion engine only by the heated fuel by suppressing a flow of the non-heated fuel into the fuel delivery pipe. Accordingly, the fuel injection controlling apparatus can keep an effect of improvement of the start property at the low temperature start achieved by the heated fuel without being disturbed by the non-heated fuel. That is, the effect of improvement of the low temperature start property achieved by the heated fuel can be made effective by the fuel injection controlling apparatus of the internal combustion engine. Further, the fuel injection controlling apparatus of the internal combustion engine according to the present invention can start the fuel injection using the start fuel injection valve suitable for improving the low temperature start property at the low temperature start as the start point, in other words, can inject the fuel continuously heated at least a number of times suitable for improving the low temperature start property. Accordingly, the fuel injection controlling apparatus can keep the effect of improvement of the start property at the low temperature start achieved by the heated fuel without being disturbed by the non-heated fuel. That is, since the fuel injection controlling apparatus of the internal combustion engine can prevent a misfire and the like caused by injecting the non-heated fuel, the effect of improvement of the low temperature start property achieved by the heated fuel can be made effective.

Figure 1:
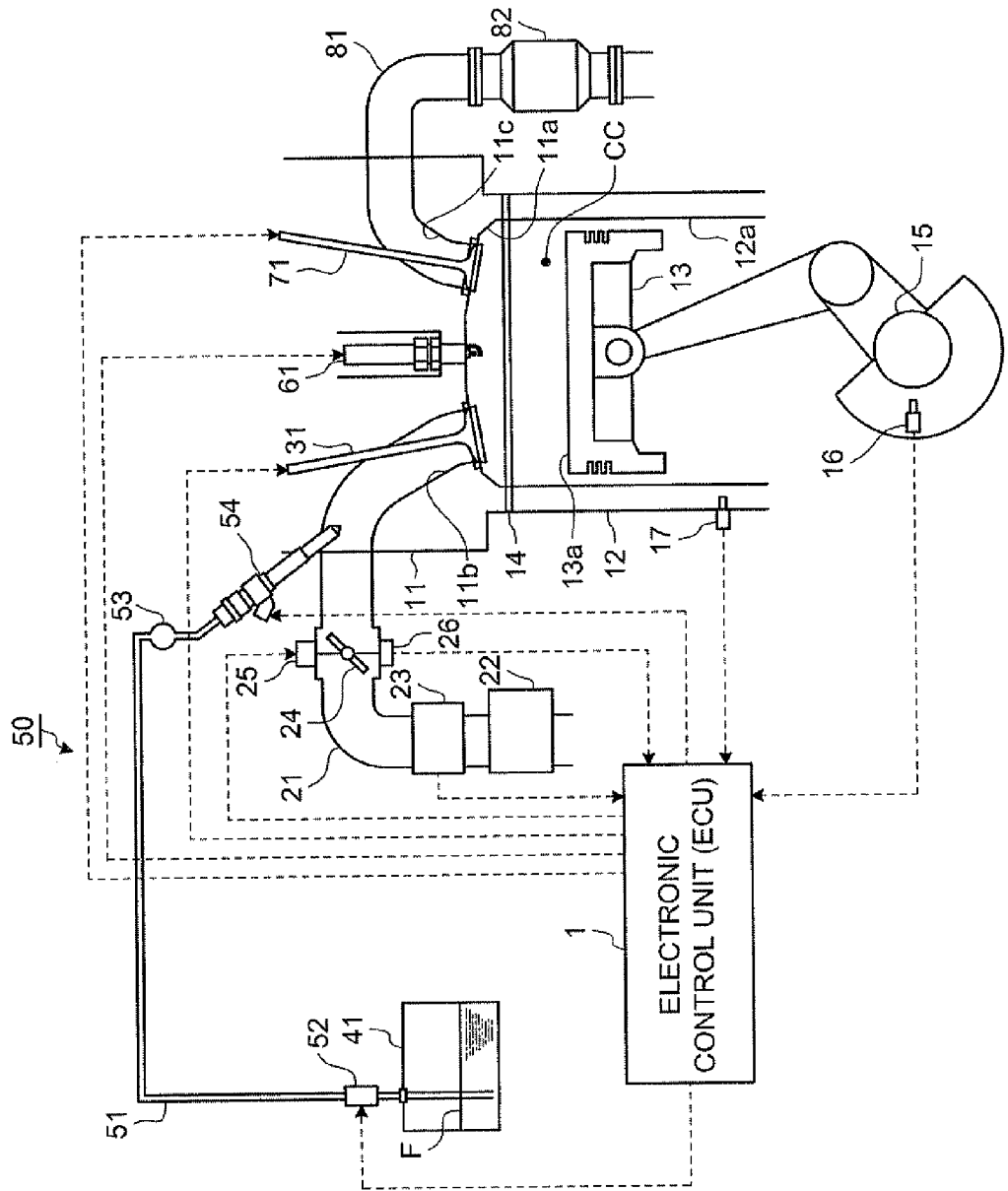
FIG. 1 is a view illustrating an example of an internal combustion engine to which a fuel injection controlling apparatus of an internal combustion engine according to the present invention is applied.

EXPLANATIONS OF LETTERS OR NUMERALS 1 electronic control unit
11b suction port
13 piston
16 crank angle sensor
17 water temperature sensor
41 fuel tank
50 fuel supply unit
51 fuel path
52 feed pump (fuel pump)
53, 153 fuel delivery pipe
54 fuel injection valve
54a first fuel injection valve
54b second fuel injection valve
54c third fuel injection valve
54d fourth fuel injection valve
55,155 heating means
154a first fuel injection valve
154b second fuel injection valve
154c third fuel injection valve
154d fourth fuel injection valve
154e fifth fuel injection valve
154f sixth fuel injection valve
CC combustion chamber
F fuel (heated fuel, non-heated fuel)

BEST MODES FOR CARRYING OUT THE INVENTION

Embodiments of a fuel injection controlling apparatus of an internal combustion engine according to the present invention will be explained below in detail based on the drawings. Note that the present invention is by no means limited by the embodiments.

First Embodiment

A first embodiment of a fuel injection controlling apparatus of an internal combustion engine according to the present invention will be explained based on from FIG. 1 to FIG. 8. The fuel injection controlling apparatus of the first embodiment will be explained in detail below while explaining an example of the internal combustion engine as an application target.

The internal combustion engine exemplified here is a multi-fuel internal combustion engine which is mounted on a so-called flexible fuel vehicle and can be operated using also fuels having a different fuel property such as a gasoline fuel, an alcohol fuel (ethanol, methanol, butanol, and the like) or a mixed fuel of them, and various control operations such as combustion control are executed by an electronic control unit (ECU) 1 shown in FIG. 1. Note that the electronic control unit 1 is composed of a CPU (Central Processing Unit), a ROM (Read Only Memory) previously storing a predetermined control program and the like, a RAM (Random Access Memory) temporarily storing a result of an arithmetic operation of the CPU, a backup RAM storing previously prepared information and the like, and the like, any of these unit and memories not shown.

First, an arrangement of the internal combustion engine exemplified here will be explained based on FIG. 1. Note that, although FIG. 1 shows only one cylinder for the purpose of convenience, a plurality of cylinders are actually provided.

The internal combustion engine includes a cylinder head 11, a cylinder block 12, and a piston 13 for forming a combustion chamber CC. The cylinder head 11 is tightened to the cylinder block 12 by bolts and the like through a head gasket 14 shown in FIG. 1, and the piston 13 is reciprocatingly movably disposed in a space between a concave portion 11a of a lower surface of the cylinder head 11 and a cylinder bore 12a of the cylinder block 12 formed by the cylinder head 11 and the cylinder block 12. The combustion chamber CC described above is composed of a space surrounded by a wall surface of the concave portion 11a of the cylinder head 11, a wall surface of the cylinder bore 12a, and an apex surface 13a of the piston 13.

The internal combustion engine feeds air and a fuel into the combustion chamber CC according to an operation condition such as an engine speed, an engine load, and the like and executes a combustion control according to the operation condition. The air is sucked from the outside through a suction path 21 and a suction port 11b of the cylinder head 11 shown in FIG. 1. In contrast, the fuel is supplied using a fuel supply unit 50 shown in FIG. 1.

First, a supply path of air will be explained.

An air cleaner 22 for removing foreign substances such as dusts and the like contained in air introduced from the outside and a sucked air amount detection means 23 for detecting an amount of air sucked from the outside are disposed on the suction path 21 of the internal combustion engine. An air amount detection sensor such as an air flow meter for directly detecting an amount of sucked air and a suction pipe pressure sensor for detecting a pressure (that is, suction pressure) in the suction path 21 are considered as the sucked air amount detection means 23. When the latter suction pipe pressure sensor is used, the sucked air amount is indirectly determined from a suction pressure of the air and the engine speed. In the internal combustion engine, a signal detected by the sucked air amount detection means 23 is sent to the electronic control unit 1, and the electronic control unit 1 calculates the sucked air amount, the engine load, and the like based on the detected signal. Note that the engine speed can be found from a signal detected by a crank angle sensor 16 for detecting a rotation angle of a crank shaft 15.

Further, a throttle valve 24 for adjusting the sucked air amount into the combustion chamber CC and a throttle valve actuator 25 for opening and closing the throttle valve 24 are disposed downstream of the sucked air amount detection means 23 on the suction path 21. The electronic control unit 1 of the first embodiment is prepared with a throttle valve control means for drive-controlling the throttle valve actuator 25 according to the operation condition and adjusting a valve opening angle of the throttle valve 24 so that the valve opening angle is set to an valve opening degree (in other words, the sucked air amount) according to the operation condition. Here, a throttle valve opening control means is composed of the throttle valve actuator 25 and the throttle valve control means. For example, the throttle valve 24 is adjusted so that air is sucked into the combustion chamber CC in an amount necessary to set an air/fuel ratio according to the operation condition. The internal combustion engine is provided with a throttle opening sensor 26 for detecting a valve opening degree of the throttle valve 24 and transmitting a detected signal to the electronic control unit 1.

In contrast, one end of the suction port 11b opens to the combustion chamber CC, and a suction valve 31 is disposed to the opening portion to open and close the opening. The number of the opening may be one or plural, and the suction valve 31 is disposed to each of the openings. Accordingly, in the internal combustion engine, air is sucked from the suction port 11b into the combustion chamber CC by opening the suction valve 31, whereas a flow of air into the combustion chamber CC is shut off by closing the suction valve 31.

As the suction valve 31, there is a valve which is opened and closed by rotation of, for example, a not shown suction side cam shaft and elastic force of an elastic member (helical spring). This type of suction valve 31 is opened and closed at previously set open/close timings by causing a suction side cam shaft to associate with rotation of the crank shaft 15 by interposing a power transmission mechanism composed of a chain, a sprocket and the like between the suction side cam shaft and the crank shaft 15. The suction valve 31, which is opened and closed in synchronization with the rotation of the crank shaft 15, can be applied in the internal combustion engine exemplified here.

However, the internal combustion engine may be provided with a variable valve mechanism such as a so-called variable valve timing & lift mechanism which can change the open/close timings and a lift amount of the suction valve 31. With this arrangement, the open/close timings and the lift amount of the suction valve 31 can be preferably changed according to the operation condition and an operation mode. Further, the internal combustion engine may use a so-called electromagnetic drive valve which opens and closes the suction valve 31 making use of an electromagnetic force to obtain the same operation/working effect as that of the variable valve mechanism.

Subsequently, the fuel supply unit 50 will be explained.

Considered as the fuel supply unit 50 are a fuel supply unit, which injects a fuel in one fuel tank into the suction port 11b or/and into the combustion chamber CC, a fuel supply unit, which mixes fuels with a different fuel property stored in a plurality of fuel tanks by fuel mixing unit and the like and injects a mixed fuel into the suction port 11b or/and into the combustion chamber CC, and the like. The first embodiment typically exemplifies a port injection type fuel supply unit which injects a fuel F stored in one fuel tank 41 into the suction port 11b and introduces the fuel F into the combustion chamber CC together with sucked air.

Specifically, the fuel supply unit 50 has a feed pump 52 as a fuel pump for sucking the fuel F from the fuel tank 41 and feeding it into a fuel path 51, a fuel delivery pipe 53 for distributing the fuel F in the fuel path 51 to respective cylinders, and fuel injection valves (fuel injection means) 54 of the respective cylinders for injecting the fuel F supplied from the fuel delivery pipe 53 into the respective suction ports 11b.

The fuel supply unit 50 is arranged such that the feed pump 52 and the fuel injection valve 54 are drive-controlled by the electronic control unit 1 which acts also as a fuel injection controlling apparatus according to the operation condition so that the fuel F is injected under a fuel injection condition such as a fuel injection amount, a fuel injection timing, a fuel injection period, and the like corresponding to the operation condition. For example, the electronic control unit 1 causes the feed pump 52 to suck the fuel F from the fuel tank 41 and causes the fuel injection valve 54 to inject the Fuel F under the fuel injection condition according to the operation condition.

The fuel F supplied into the suction port 11b as described above is supplied into the combustion chamber CC as the suction valve 31 opens while being mixed with the air described above in the suction port 11b and combusted by an ignition operation of an ignition plug 61 when an ignition timing according to the operation condition is reached. Then, an in-cylinder gas (combustion gas) after the fuel F is combusted is exhausted from the combustion chamber CC into an exhaust port 11c shown in FIG. 1 and discharged to the atmosphere through an exhaust path 81.

An exhaust valve 71 for opening and closing an opening between the exhaust port 11c and the combustion chamber CC is disposed to the exhaust port 11c. The number of the opening may be one or plural, and the exhaust valve 71 described above is disposed to each of the openings. Accordingly, in the internal combustion engine, the combustion gas is exhausted from inside of the combustion chamber CC into the exhaust port 11c by opening the exhaust valve 71, and an exhaust of the combustion gas into the exhaust port 11c is shut off by closing the exhaust valve 71.

As with the suction valve 31 described above, a valve to which a power transmission mechanism is interposed, a valve provided with a variable valve mechanism such as a so-called variable valve timing & lift mechanism and the like, and a so-called electromagnetic drive valve can be applied as the exhaust valve 71.

Further, an exhaust gas purification device 82 is disposed on the exhaust path 81, and harmful components in an exhaust gas are purified thereby.

A gasoline fuel, an alcohol fuel, or an alcohol-mixed fuel is mainly considered as the fuel F capable of being used to the engine as described above. The alcohol-mixed fuel is a mixed fuel of the alcohol fuel and at least one kind of a fuel having a fuel property different from that of the alcohol fuel, and it is assumed here that the alcohol fuel is mixed with a hydrocarbon fuel (for example, the gasoline fuel). Accordingly, a problem is less likely to occur when a pure gasoline fuel is used. However, when a pure alcohol fuel and an alcohol-mixed fuel are used at a low temperature start, since the alcohol fuel and the alcohol-mixed fuel are inferior to the gasoline fuel in evaporation characteristics, there is a possibility that the pure alcohol fuel and the alcohol-mixed fuel cannot be ignited by the ignition plug 61 or is misfired at once even if it is ignited. The above disadvantage prominently appears as an alcohol concentration is made higher.

Thus, the internal combustion engine disposes a heating means such as a heater on the fuel supply unit 50 to cope with deterioration of a start property at the low temperature start when the internal combustion engine is operated by the alcohol fuel and the alcohol-mixed fuel and improves the evaporation characteristics by previously heating the fuel F.

Figure 2:
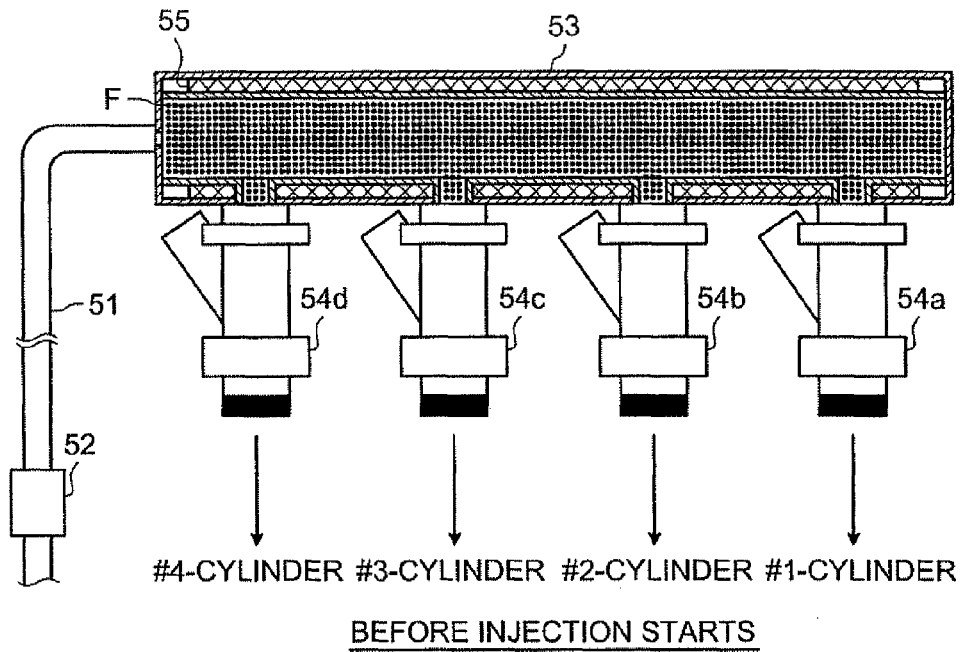
FIG. 2 is a view illustrating a state inside of a fuel delivery pipe for an in-line four cylinder internal combustion engine before injection starts.

For example, as shown in FIG. 2, a heating means 55 is disposed to the fuel delivery pipe 53 so that the fuel F in the fuel delivery pipe 53 fed from the fuel path 51 is heated thereby. The heating means 55 is turned on and off by a fuel heating control means of the electronic control unit 1. That is, it is considered that an ignition operation is executed appropriately even if the fuel F is not heated, for example, after completion of a warm-up operation and when the engine is operated by the gasoline fuel. Accordingly, the heating means 55 executes a heat operation (ON operation) mainly when the engine is started by the alcohol fuel or the alcohol-mixed fuel having a bad low temperature start property. When an engine cooling water temperature is lower than a predetermined temperature at a time, for example, an ignition ON signal is detected or at a time a door lock release signal is detected, the heat operation is previously executed before an engine start operation (that is, a cranking operation) is executed. Further, the heat operation may be executed when the engine cooling water temperature is lower than the predetermined temperature even after the warm-up operation is completed. The engine cooling water temperature can be detected by a water temperature sensor 17 shown in FIG. 1.

Figure 3:
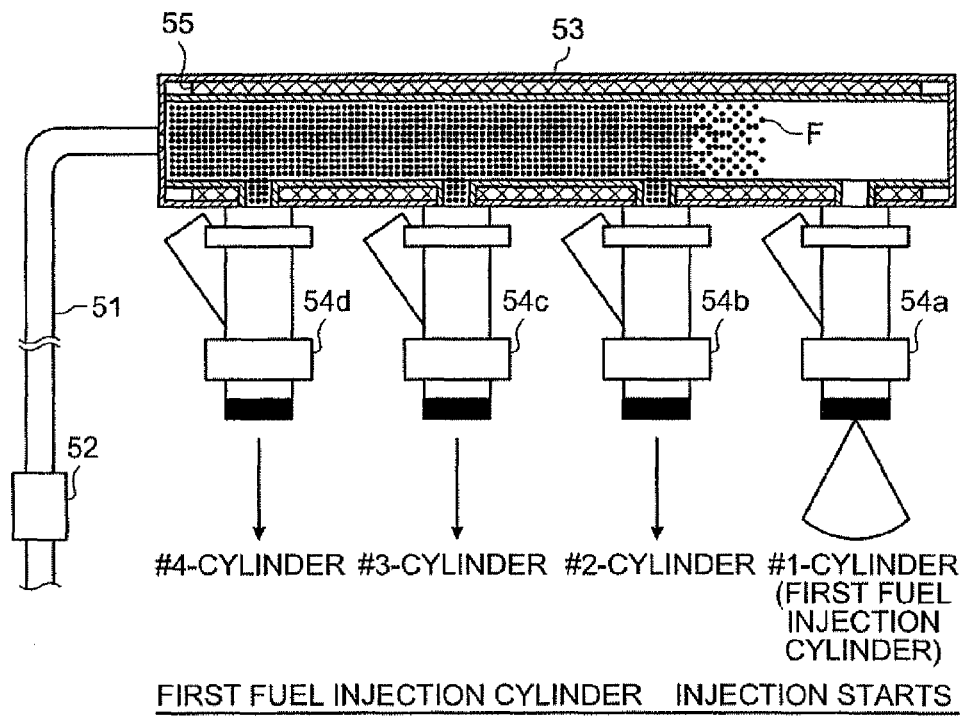
FIG. 3 is a view illustrating a state inside of a fuel delivery pipe of a first embodiment for the in-line four cylinder internal combustion engine when fuel injection starts to a #1-cylinder as a first fuel injection cylinder.

Incidentally, the feed pump 52 is generally in a driven state at all times. Accordingly, when the fuel F is injected from the fuel injection valve 54, the fuel F is replenished into the fuel delivery pipe 53 from the fuel path 51 by the injected amount thereof. For example, FIG. 2 illustrates the fuel delivery pipe 53 for an in-line four cylinder internal combustion engine and first to fourth fuel injection valves 54*a* to 54*d* for a #1-cylinder to a #4-cylinder. As shown in FIG. 3, when the fuel F is injected from the first fuel injection valve 54*a*, the fuel F of the amount used for the injection is forcibly fed into the fuel delivery pipe 53 by a pressure feed operation of the feed pump 52. Note that a fuel supply port (a joint portion of the fuel delivery pipe 53 and the fuel path 51) in the fuel delivery pipe 53 is set to the fourth fuel injection valve 54*d* side.

Since FIG. 2 shows a state before the engine starts and before the fuel F is injected, when the engine is started at a low temperature by the alcohol fuel or the alcohol-mixed fuel, the fuel F in the fuel delivery pipe 53 is in a state that it is heated by the heating means 55 in a state shown in FIG. 2. Accordingly, as shown in FIG. 3, when a fuel being heated (hereinafter, called "heated fuel") F is injected from the first fuel injection valve 54*a*, a fuel which is not heated (hereinafter, called "non-heated fuel") F of the amount corresponding to that of the fuel F used for the injection is fed from the fuel path 51 into the fuel delivery pipe 53. Since a fuel injection is continuously executed from the respective fuel injection valves (first to fourth fuel injection valves 54*a* to 54*d*) in a minute time, almost all the non-heated fuel F newly fed into the fuel delivery pipe 53 is injected without being heated by the heating means 55. Further, since the non-heated fuel F deprives heat of the heated fuel F in the fuel delivery pipe 53, the evaporation characteristics of the heated fuel F, which are improved by the heat operation of the heating means 55, are deteriorated again. Accordingly, in the internal combustion engine, when the non-heated fuel F and the heated fuel F whose heat is deprived are injected at an early stage after the engine starts, since a misfire and the like are caused, there is a possibility that the low temperature start property is not improved.

To cope with the above problem, in the first embodiment, the feed pump 52 is stopped during a predetermined time when the heat operation is executed to the fuel F by the heating means 55 so that the non-heated fuel F is not supplied into the fuel delivery pipe 53.

Figure 4:
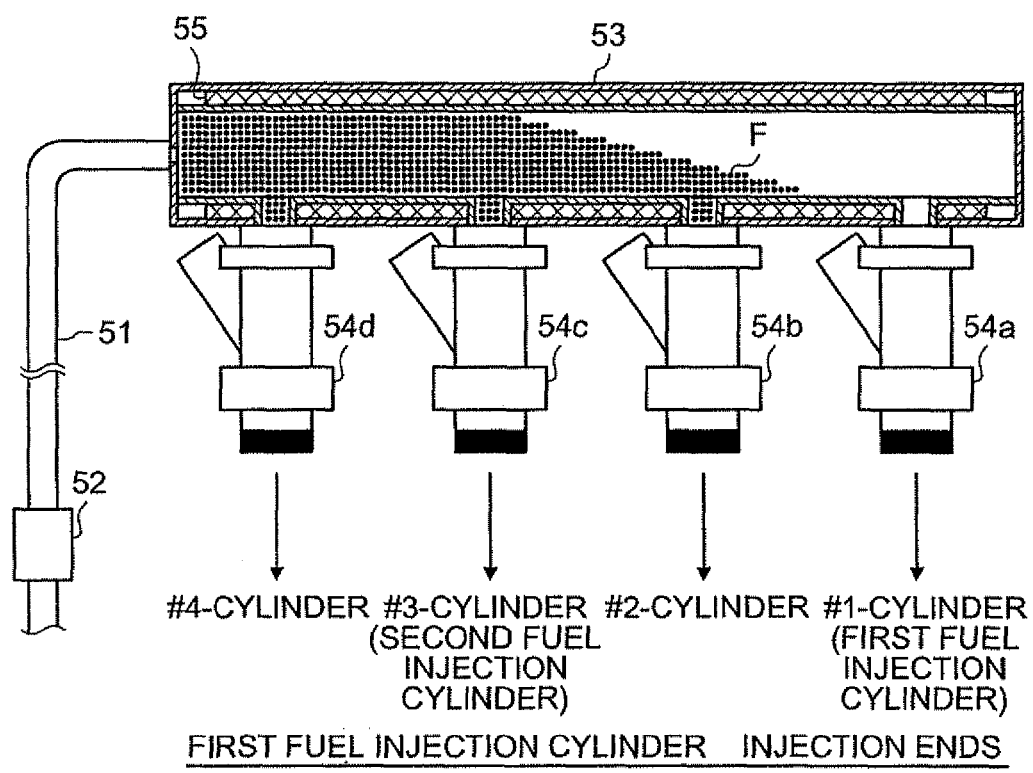
FIG. 4 is a view illustrating a state inside of the fuel delivery pipe of the first embodiment for the in-line four cylinder internal combustion engine when the fuel injection to the #1-cylinder as the first fuel injection cylinder ends.

In the internal combustion engine, it is assumed that when, for example, a fuel injection is executed in a sequence of from the #1-cylinder to the #2-cylinder through the #3-cylinder, the #4-cylinder and the fuel F can be ignited continuously at least three times at the low temperature start, a stable combustion will be executed even thereafter. Further, in the fuel supply unit 50 of the internal combustion engine, a fuel amount, which can be stored in the fuel delivery pipe 53, and respective fuel injection amounts of the first to fourth fuel injection valves 54*a* to 54*d* are set so that the fuel injection can be executed at least three times even if the fuel F is not supplied into the fuel delivery pipe 53. In this case, when the feed pump 52 stops, since the non-heated fuel F is not supplied into the fuel delivery pipe 53 as shown in FIG. 4 even after the fuel F is injected from, for example, the first fuel injection valve 54*a* of the #1-cylinder, the heated fuel F is injected also from the third fuel injection valve 54*c* of the #3-cylinder for executing a next fuel injection and further from the fourth fuel injection valve 54*d* of the #4-cylinder for executing a next fuel injection so that deterioration of the low temperature start property is avoided.

Figure 5:
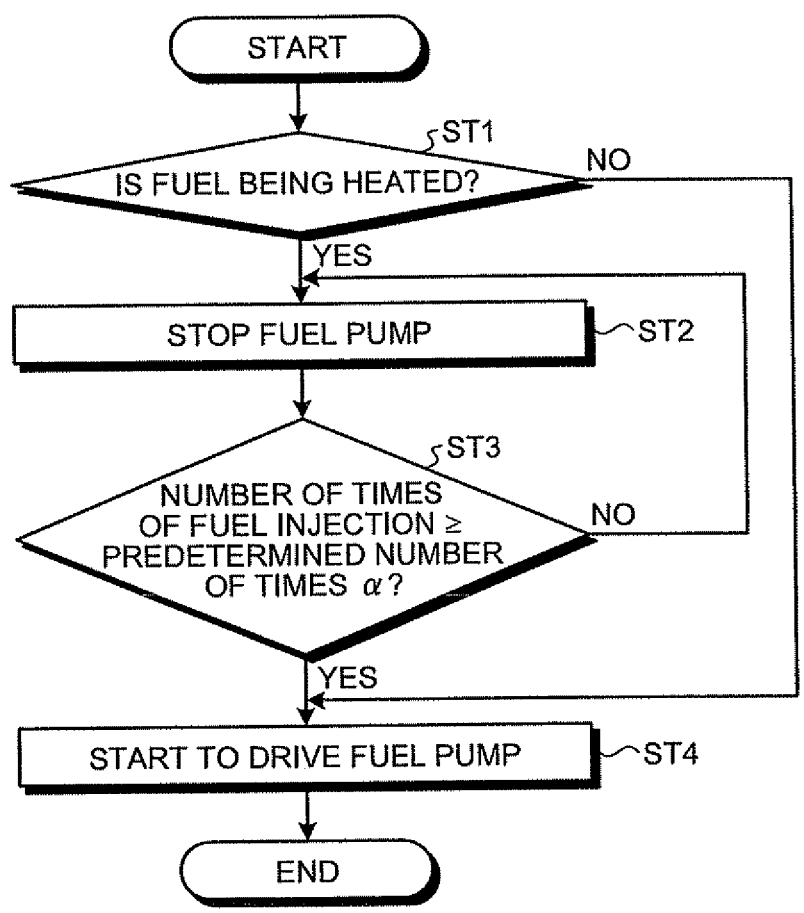
FIG. 5 is a flowchart explaining a control operation executed by a fuel injection controlling apparatus of the first embodiment at a low temperature start.

Specifically, the electronic control unit 1 (fuel injection controlling apparatus) of the first embodiment determines whether or not the heat operation to the fuel F is executed by the heating means 55 as shown in a flowchart of FIG. 5 (step ST1). The determination can executed by finding whether the electronic control unit 1 itself (fuel heating control means) instructs an ON operation or an OFF operation to the heating means 55.

When the heat operation is not executed here, a fuel pump control means of the electronic control unit 1 goes to step ST4 to be described later and starts to drive the feed pump 52. Here, the feed pump 52 is continuously driven assuming that it is already driven.

In contrast, when the heat operation is being executed by the heating means 55, the fuel pump control means instructs to stop the drive operation of the feed pump 52 (step ST2).

With this operation, in the fuel supply unit 50 of the internal combustion engine, since a pressure feed of the non-heated fuel F from the feed pump 52 is stopped, only the heated fuel F remains in the fuel delivery pipe 53. Accordingly, in the fuel supply unit 50, even if the fuel injection is executed from a fuel injection valve disposed near to the fuel supply port of the fuel delivery pipe 53 at an early stage after an engine start operation, only the heated fuel F whose evaporation characteristics are improved is injected from the fuel injection valve. Accordingly, in the internal combustion engine, the low temperature start property is improved.

When, for example, the #1-cylinder acts as a first fuel injection target cylinder (hereinafter, called "first fuel injection cylinder") at the low temperature start, the heated fuel F is supplied also to the #3-cylinder which is a cylinder (hereinafter, called "second fuel injection cylinder) from which the fuel injection is executed second and to the #4-cylinder which is a cylinder (hereinafter, called "third fuel injection cylinder) from which the fuel injection is executed third. That is, in this case, since the heated fuel F is injected also from the third fuel injection valve 54*c* of the #3-cylinder which is disposed near to the fuel supply port of the fuel delivery pipe 53 and executes the injection operation second and also from the fourth fuel injection valve 54*d* of the #4-cylinder which executes the injection operation third, a good low temperature start property can be obtained by avoiding a faulty ignition, a misfire, and the like. When it is assumed here that the feed pump 52 is not stopped in this case, there is a high possibility that the heated fuel F whose evaporation characteristics is deteriorated by radiating its heat to the non-heated fuel F is supplied into the #3-cylinder acting as the second fuel injection cylinder and there is a high possibility that the non-heated fuel F is supplied as it is into the #4-cylinder acting as the next third fuel injection cylinder. Accordingly, there is a possibility that the internal combustion engine cannot be started in a low temperature state because the faulty ignition, the misfire, and the like occur.

Further, when the #2-cylinder acts as the first fuel injection cylinder at the low temperature start, the injection operation is executed in a sequence of from the #2-cylinder to the #3-cylinder through the #1-cylinder. When it is assumed that the feed pump 52 is not stopped, since there is a high possibility that the non-heated fuel F is supplied as it is into the #3-cylinder acting as the third fuel injection cylinder, there is a possibility that the internal combustion engine cannot start in the low temperature state because the faulty ignition, the misfire and the like occur. However, in this case, since the feed pump 52 is stopped and a supply of the non-heated fuel F into the fuel delivery pipe 53 is stopped, the heated fuel F is injected also from the third fuel injection valve 54c of the #3-cylinder near to the fuel supply port of the fuel delivery pipe 53 and thus the good low temperature start property can be obtained by avoiding the faulty ignition, the misfire, and the like.

Further, when the #3-cylinder acts as the first fuel injection cylinder at the low temperature start, the injection operation is executed in a sequence of from the #3-cylinder to the #2-cylinder through the #4-cylinder. However, when it is assumed that the feed pump 52 is not stopped, since there is a very high possibility that the non-heated fuel F is supplied as it is into the #4-cylinder acting as the second fuel injection cylinder, it is often impossible for the internal combustion engine to start in the low temperature state because the faulty ignition, the misfire and the like occur. That is, since the fourth fuel injection valve 54d of the #4-cylinder is disposed nearest to the fuel supply port of the fuel delivery pipe 53, when the non-heated fuel F is supplied into the fuel delivery pipe 53 even in a slight amount, the fourth fuel injection valve 54d injects the non-heated fuel F to thereby deteriorate the low temperature start property. However, in this case, since the feed pump 52 is stopped and the supply of the non-heated fuel F into the fuel delivery pipe 53 is stopped, the heated fuel F is injected also from the fourth fuel injection valve 54d of the #4-cylinder nearest to the fuel supply port of the fuel delivery pipe 53 and thus the good low temperature start property can be obtained by avoiding the faulty ignition, the misfire, and the like.

Note that when the #4-cylinder acts as the first fuel injection cylinder at the low temperature start, since the injection operation is executed in a sequence of from the #4-cylinder to the #1-cylinder through the #2-cylinder, even if the feed pump 52 is driven, the heated fuel F is supplied into the respective cylinders and thus a possibility for deteriorating the low temperature start property is small. Accordingly, in this case, the feed pump 52 need not be daringly stopped under a condition that it can be specified that the first fuel injection cylinder is the #4-cylinder. It is sufficient to specify it based on, for example, a rotation angle of the crank shaft 15, and the like.

Further, when the internal combustion engine cannot secure a stable combustion state at the low temperature start even if the heated fuel F is continuously supplied three times, it is sufficient to increase a capacity capable of storing the fuel F in the fuel delivery pipe 53.

As described above, the electronic control unit 1 (fuel injection controlling apparatus) of the first embodiment stops driving the feed pump 52 to improve the low temperature start property. However, when the stop state continues for a long time, since the fuel F in the fuel delivery pipe 53 becomes insufficient and no fuel is injected from the fuel injection valve 54, a combustion operation stops in the internal combustion engine.

Accordingly, the fuel pump control means of the electronic control unit 1 of the first embodiment determines whether or not the number of times of fuel injection becomes a predetermined number of times a or more from a time at which the fuel was injected to the first fuel injection cylinder (step ST3), and the stop state of the feed pump 52 is continued until an affirmative determination is made (it is determined that the number of times of fuel injection becomes the predetermined number of times $\alpha$ or more).

In contrast, when the affirmative determination is made at step ST3, it is determined that stopping the feed pump 52 for a further longer time causes a shortage of the fuel in the fuel delivery pipe 53, and the fuel pump control means starts to drive the feed pump 52 (step ST4). With this operation, it is possible to avoid a faulty combustion due to non-injection of the fuel F in the internal combustion engine.

Note that, as to a relation between the capacity in the fuel delivery pipe 53 in the example and the fuel injection amount of the fuel injection valve 54 (first to fourth fuel injection valves 54a to 54d), the relation is set such that when the fuel delivery pipe 53 is filled with the fuel F, the fuel injection can be executed three times without replenishing the fuel. Further, it is assumed in the internal combustion engine that when the fuel F can be ignited continuously at least three times at the low temperature start, a stable combustion operation will be executed also thereafter. Accordingly, in the predetermined number of times $\alpha$, "$\alpha=3$" is set.

As shown above, since the fuel injection controlling apparatus of the first embodiment can prevent an injection of the non-heated fuel F and a reduction in temperature of the heated fuel F caused by the non-heated fuel F at the low temperature start and only the heated fuel F is injected, the fuel injection controlling apparatus can improve the start property at the time.

Incidentally, at step ST3 described above, a timing at which the feed pump 52 starts to be driven is determined by comparing the number of times of the fuel injection with the predetermined number of times $\alpha$. Alternatively, the determination may be made by finding whether or not a remaining amount of the heated fuel F in the fuel delivery pipe 53 reduces to a predetermined amount or lower. In this case, it is determined that the start timing at which the feed pump 52 is driven reached when the remaining amount of the heated fuel F reduces to the predetermined amount or lower. The remaining amount of the heated fuel. F in the fuel delivery pipe 53 can be found from a total fuel injection amount and a number of times of the fuel injection using the first fuel injection cylinder as a start point of calculation. Accordingly, the remaining amount of the heated fuel F in the fuel delivery pipe 53 when the fuel injection is executed the predetermined number of times a may be set as a predetermined amount in this case.

Further, the determination may be made using a time elapsed from the time at which the fuel was injected into the first fuel injection cylinder. In this case, when the elapsed time reaches a predetermined time or longer, it is determined that the start timing at which the feed pump 52 is driven is reached. Here, a time elapsed from the time at which the fuel was injected into the first fuel injection cylinder when the fuel injection was executed the predetermined number of times a may be set as a predetermined time in this case.

Further, although the heating means 55 is disposed to the fuel delivery pipe 53 in the first embodiment, the heating means 55 may be disposed on the fuel path 51 downstream of the feed pump 52. Note that, in this case, the heated fuel F exists downstream of the heating means 55 in the fuel path 51.

Furthermore, although the in-line four cylinder internal combustion engine is exemplified above, the fuel injection controlling apparatus of the first embodiment described above can also be applied to a different type of an internal combustion engine. For example, a V-type six cylinder internal combustion engine will be explained here. In the internal combustion engine, a fuel injection is executed in a sequence of from a #1-cylinder to a #6-cylinder through a #2-cylinder, a #3-cylinder, a #4-cylinder, and a #5-cylinder, and it is assumed that when the fuel F can be ignited continuously at least three times at the low temperature start, a stable combustion operation will be executed also thereafter.

Figure 6:
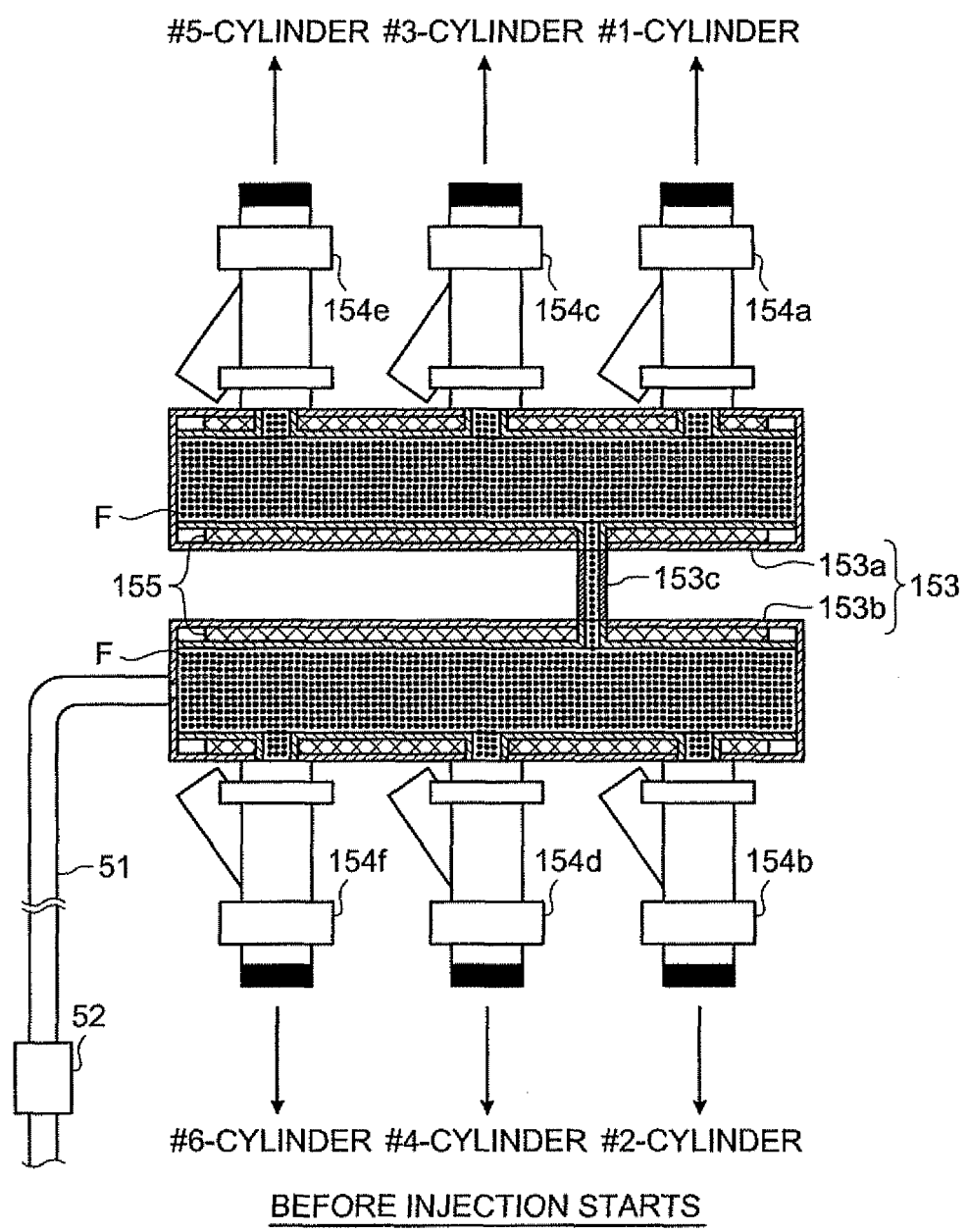
FIG. 6 is a view illustrating a state inside of a fuel delivery pipe for a V-type six cylinder internal combustion engine before injection starts.

The V-type six cylinder internal combustion engine is prepared with a fuel delivery pipe 153 shown in FIG. 6 and with first to sixth fuel injection valves 154a to 154f for the #1-cylinder to the #6-cylinder. The fuel delivery pipe 153 has a first delivery pipe main body 153a for one bank having the #1-cylinder, the #3-cylinder, and the #5-cylinder, a second delivery pipe main body 153b for the other bank having the #2-cylinder, the #4-cylinder, and the #6-cylinder, and a fuel path 153c for communicating the first and second delivery pipe main bodies 153a, 153b with each other. Further, heating means 155 such as heaters and the like are prepared for the first and second delivery pipe main bodies 153a, 153b, and the respective heating means 155 heat the fuel F supplied into the first and second delivery pipe main bodies 153a, 153b.

Here, the first, third, and fifth fuel injection valves 154a, 154c, 154e are connected to the first delivery pipe main body 153a, and the second, fourth, and the sixth fuel injection valves 154b, 154d, 154f are connected to the second delivery pipe main body 153b. In the fuel delivery pipe 153, a fuel path 51 is connected also to the second delivery pipe main body 153b, and the fuel F, which is pressure fed from a feed pump 52, is supplied into the second delivery pipe main body 153b and supplied into the first delivery pipe main body 153a through the fuel path 51. A fuel supply port (joint portion of the fuel delivery pipe 153 and the fuel path 51) in the fuel delivery pipe 153 is set on the sixth fuel injection valve 154f side of the second delivery pipe main body 153b.

In also the V-type six cylinder internal combustion engine, when the fuel F is heated by the respective heating means 155, a fuel pump control means of the electronic control unit 1 (fuel injection controlling apparatus) goes to step ST2 described above and stops a drive operation of the feed pump 52.

With this operation, in the internal combustion engine, only the heated fuel F remains in the first and second delivery pipe main bodies 153a, 153b. Thus, even if a fuel injection is executed from a fuel injection valve disposed near to the fuel supply port of the fuel delivery pipe 153 at an early stage after the engine is started as with the in-line four cylinder internal combustion engine described above, since only the heated fuel F whose evaporation characteristics are improved is injected from the fuel injection valve, the low temperature start property is improved.

When the #1-cylinder acts as a first fuel injection cylinder, since the injection operation is executed in a sequence of from the #1-cylinder to the #3-cylinder . . . through the #2-cylinder at the low temperature start, there is a high possibility that the heated fuel F is supplied into the respective cylinders even if the feed pump 52 is driven. Accordingly, in this case, the feed pump 52 need not be daringly stopped under a condition that it can be specified that the first fuel injection cylinder is the #1-cylinder. This is the same when the #6-cylinder acts as the first fuel injection cylinder at the low temperature start.

Further, when the #3-cylinder acts as the first fuel injection cylinder at the low temperature start, since the injection operation is executed in a sequence of from the #3-cylinder to #5-cylinder . . . through the #4-cylinder, there is a high possibility that the heated fuel F is injected also from the fourth fuel injection valve 154d of the #4-cylinder acting as a second fuel injection cylinder disposed near to the fuel supply port of the fuel delivery pipe 153. Accordingly, the feed pump 52 need not be daringly stopped under a condition that it can be specified that the first fuel injection cylinder is the #3-cylinder.

In contrast, when the #2-cylinder acts as the first fuel injection cylinder at the low temperature start, the injection operation is executed in a sequence of from the #2-cylinder to the #4-cylinder . . . through the #3-cylinder. However, when it is assumed that the feed pump 52 is not stopped, there is a high possibility that the non-heated fuel F is supplied as it is into the #4-cylinder acting as a third fuel injection cylinder near to the fuel supply port of the fuel delivery pipe 153. Accordingly, there is a possibility that the internal combustion engine cannot be started in the low temperature state because the faulty ignition, the misfire, and the like occur. However, in this case, since the feed pump 52 is stopped and a supply of the non-heated fuel. F into the fuel delivery pipe 153 is stopped, the heated fuel F is injected also from the fourth fuel injection valve 154d of the #4-cylinder near to the fuel supply port of the fuel delivery pipe 153 and a good low temperature start property can be obtained by avoiding the faulty ignition, the misfire, and the like. This is the same when the #4-cylinder acts as the first fuel injection cylinder at the low temperature start. In the internal combustion engine, the heated fuel F is injected also from the sixth fuel injection valve 154f of the #6-cylinder acting as the third fuel injection cylinder nearest to the fuel supply port of the fuel delivery pipe 153 by stopping the feed pump 52.

Figure 7:
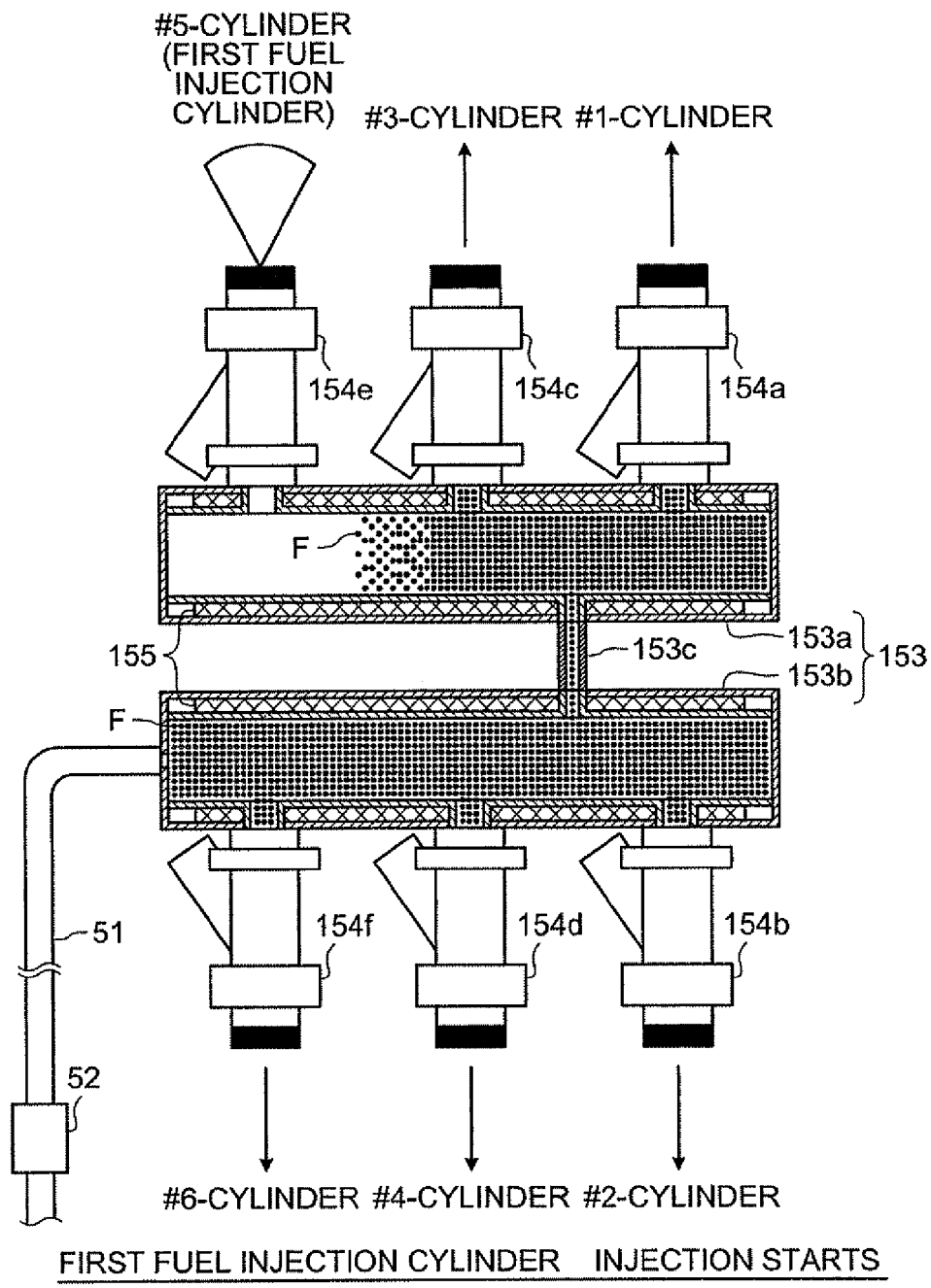
FIG. 7 is a view illustrating a state inside of a fuel delivery pipe of the first embodiment for the V-type six cylinder internal combustion engine when fuel injection starts to a #5-cylinder as a first fuel injection cylinder.
Figure 8:
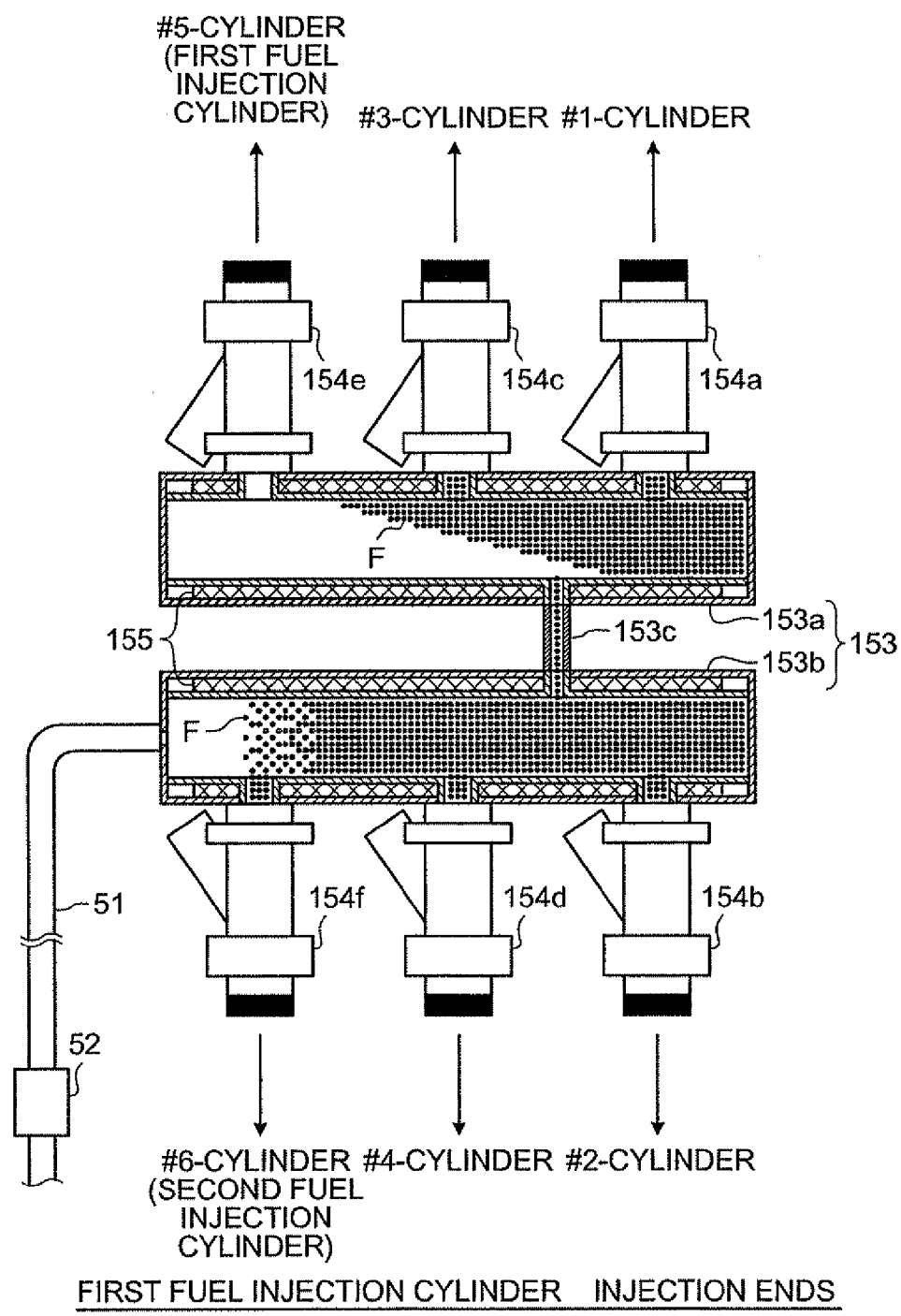
FIG. 8 is a view illustrating a state inside of the fuel delivery pipe of the first embodiment for the V-type six cylinder internal combustion engine when the fuel injection to the #5-cylinder as the first fuel injection cylinder ends.

Further, when the #5-cylinder acts as the first fuel injection cylinder at the low temperature start, the injection operation is executed in a sequence of from the #5-cylinder to the #1-cylinder . . . through the #6-cylinder. Thus, when fuel injection is executed from the fifth fuel injection valve 154e of the #5-cylinder as shown in FIGS. 7 and 8 on the assumption that the feed pump 52 is not stopped, there is a high possibility that the non-heated fuel F is supplied as it is into the #6-cylinder acting as the second fuel injection cylinder nearest to the fuel supply port of the fuel delivery pipe 153. Accordingly, there is a possibility that the internal combustion engine in this case cannot be started in the low temperature state because the faulty ignition, the misfire, and the like occur. However, since the feed pump 52 is stopped and a supply of the non-heated fuel F into the fuel delivery pipe 153 is stopped also in this case, the heated fuel F is injected also from the sixth fuel injection valve 154f of the #6-cylinder. Accordingly, the internal combustion engine can obtain the good low temperature start property by avoiding the faulty ignition, the misfire, and the like.

Second Embodiment

Next, a second embodiment of the fuel injection controlling apparatus of the internal combustion engine according to the present invention will be explained based on FIGS. 9 to 13. It is assumed that the fuel injection controlling apparatus of the second embodiment is prepared as a function of an electronic control unit 1 as with the first embodiment. Further, in the second embodiment, the fuel injection controlling apparatus will be explained using the in-line four cylinder internal combustion engine exemplified in the first embodiment.

When the fuel F is heated, the fuel injection controlling apparatus of the first embodiment described above improves a low temperature start property by injecting only the heated fuel F by stopping a supply of the non-heated fuel F into a fuel delivery pipe 53 by completely stopping a feed pump 52 for a predetermined period at the low temperature start.

However, when a fuel injection is executed in the state that the feed pump 52 is stopped, since a negative pressure is generated in the fuel delivery pipe 53 and increases as the number of times of fuel injection increases in the state that the feed pump 52 stops, there is a possibility that the following disadvantages arise.

First, there is a possibility that the non-heated fuel F in a fuel path 51 flows into the fuel delivery pipe 53 by the negative pressure. In this case, there is a possibility that a low temperature start property of the internal combustion engine is deteriorated by the unintentional non-heated fuel F. That is, the non-heated fuel F or the heated fuel F whose heat is radiated by the non-heated fuel F may be injected at early stages such as a second and third injection times after a fuel injection operation starts depending on a timing at which the non-heated fuel F flows. In this case, there is a high possibility that the low temperature start property is deteriorated by the injected fuel F. Further, when a fuel injection valve 54 has low gas tightness, there is a possibility that a combustion gas and air in a combustion chamber CC is sucked into the fuel delivery pipe 53 through the fuel injection valve 54 by the negative pressure. Accordingly, when the fuel injection valve 54 executes the fuel injection operation next, there is a possibility that an injection of the fuel F is restricted such that only the sucked combustion gas and the like are injected and the fuel. F is not injected, or a fuel injection amount is reduced, and the like.

It is not preferable to stop the feed pump 52 at any time when the fuel is heated as described above depending on a timing at which the feed pump 52 is stopped. To improve the disadvantage, the non-heated fuel F in the fuel path 51 is forcibly supplied into the fuel delivery pipe 53 by driving the feed pump 52 when the low temperature start property is not deteriorated even if the non-heated fuel F flows. In contrast, when there is a possibility that the low temperature start property is deteriorated by the flow of the non-heated fuel F, it is sufficient to suppress the forcible supply of the non-heated fuel F. That is, as a countermeasure for overcoming the disadvantage, it is sufficient to supply the non-heated fuel F from the fuel path 51 in an appropriate flow amount at an appropriate timing.

Specifically, the supply timing and the supply amount of the non-heated fuel F supplied into the fuel delivery pipe 53 and the effect of the non-heated fuel F to the low temperature start property relate to at which stage the non-heated fuel F is injected after the fuel injection operation starts, and this can be determined by specifying a first fuel injection cylinder. That is, in the second embodiment, a drive amount of the feed pump 52 (in other words, a fuel feed amount from the feed pump 52) is controlled according to the specified first fuel injection cylinder. Accordingly, the electronic control unit 1 of the second embodiment is provided with a first fuel injection cylinder specifying means for specifying the first fuel injection cylinder. A fuel pump control means of the electronic control unit 1 is arranged such that it controls the fuel feed amount from the feed pump 52 at the low temperature start according to the first fuel injection cylinder.

The first fuel injection cylinder specifying means is arranged such that it specifies the first fuel injection cylinder based on, for example, a rotation angle of a crank shaft 15 detected by a crank angle sensor 16 and on a rotation angle of a not shown cam shaft according to a suction valve 31 and an exhaust valve 71. That is, the positions of pistons 13 in respective cylinders in the reciprocatingly moving directions thereof can be found by finding the rotation angle of the crank shaft 15 and in which stroke each cylinder is (that is, suction stroke and the like) can be found by finding the rotation angle of the cam shaft. Accordingly, the first fuel injection cylinder specifying means can specify the first fuel injection cylinder based on these information.

When the first fuel injection cylinder is specified as described above, a second fuel injection cylinder, a third fuel injection cylinder, and the like can also be specified based on an injection sequence of the respective fuel injection valves 54 (first to fourth fuel injection valves 54a to 54d). Accordingly, when the non-heated fuel F is supplied into the fuel delivery pipe 53, it can be found that from a fuel injection valve of which cylinder the non-heated fuel F is injected. Hereinafter, a fuel injection valve, which injects the non-heated fuel F at the time, is called a "non-heated fuel injection valve". When an injection timing of the non-heated fuel F injected by the non-heated fuel injection valve is reached earlier than an injection timing of the heated fuel F into the first fuel injection cylinder, the low temperature start property of the internal combustion engine is more deteriorated. Accordingly, in the second embodiment, when the injection timing of the non-heated fuel F injected by the non-heated fuel injection valve is reached earlier, the fuel feed amount of the feed pump 52 is reduced. For example, the electronic control unit 1 of the second embodiment is provided with a non-heated fuel injection valve specifying means for specifying the non-heated fuel injection valve based on the information of the first fuel injection cylinder and on the injection sequence of the respective fuel injection valves 54 (first to fourth fuel injection valves 54a to 54d). Further, in a drive amount control of the feed pump 52 according to the first fuel injection cylinder executed by the fuel pump control means, when the injection timing of the non-heated fuel F injected by the non-heated fuel injection valve is reached earlier, a drive amount of the feed pump 52 is more reduced.

Figure 9:
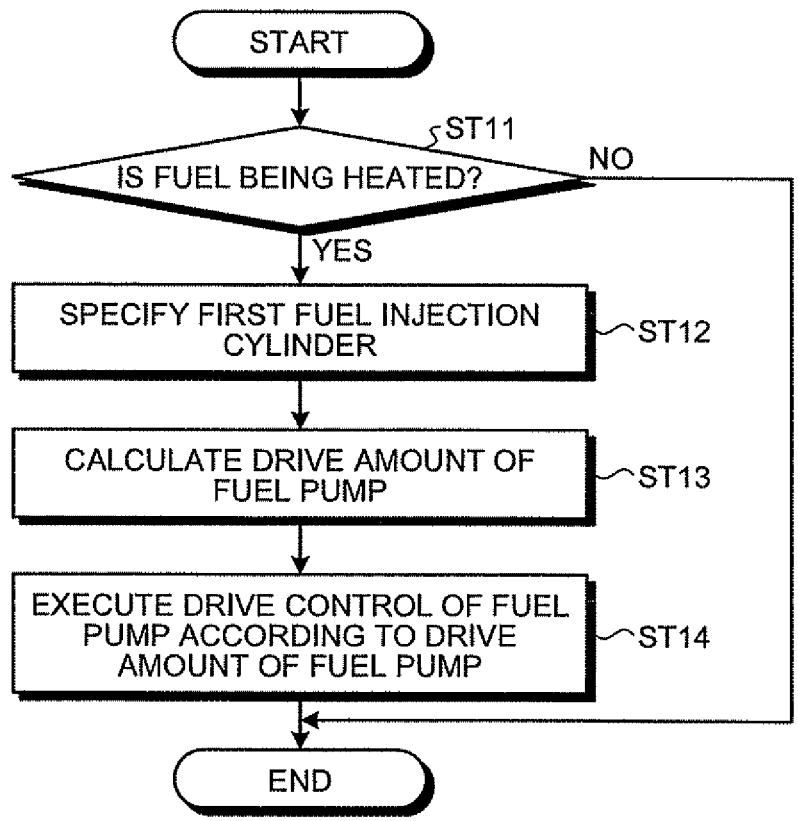
FIG. 9 is a flowchart explaining a control operation executed by a fuel injection controlling apparatus of a second embodiment at a low temperature start.

A control operation of a fuel injection controlling apparatus (electronic control unit 1) of the second embodiment at the low temperature start will be explained based on a flowchart of FIG. 9. Note that it is assumed that, in the internal combustion engine exemplified here, a fuel injection is executed in a sequence of from a #1-cylinder to a #2-cylinder through #3-cylinder and a #4-cylinder similarly to the first embodiment.

First, the electronic control unit 1 of the second embodiment determines whether or not a heat operation is executed to the fuel F by a heating means 55 as with the first embodiment (step ST11).

When the heat operation is not executed, the electronic control unit 1 ends the control operation. Note that, at the time, a drive control of the feed pump 52, which is different from a drive amount control of the feed pump 52 to be described later, is executed.

In contrast, when the heat operation is being executed by the heating means 55, the electronic control unit 1 of the second embodiment causes the first fuel injection cylinder specifying means to specify the first fuel injection cylinder (step ST12).

The fuel pump control means of the second embodiment determines the drive amount of the feed pump 52 according to the first fuel injection cylinder (step ST13) and executes the drive control of the feed pump 52 according to the drive amount, that is, executes the drive amount control of the feed pump 52 (step ST14).

A correspondence relation between the first fuel injection cylinder and the drive amount of the feed pump 52 is previously prepared here as map data.

Figure 10:
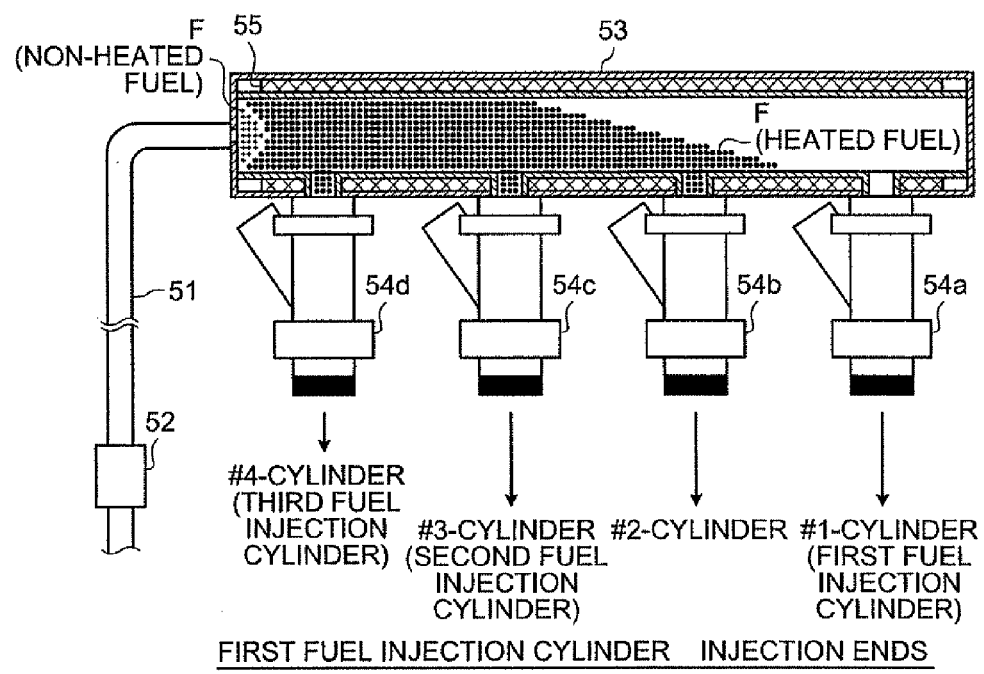
FIG. 10 is a view illustrating a state inside of a fuel delivery pipe of the second embodiment for the in-line four cylinder internal combustion engine when fuel injection to the #1-cylinder as the first fuel injection cylinder ends.

When, for example, the #1-cylinder acts as the first fuel injection cylinder at the low temperature start, the third fuel injection valve 54c and the fourth fuel injection valve 54d disposed near to a fuel supply port of the fuel delivery pipe 53 act as a second fuel injection cylinder and a third fuel injection cylinder, respectively as shown in FIG. 10. Accordingly, in this case, unless the drive amount of the feed pump 52 is reduced, there is a high possibility that the heated fuel F whose evaporation characteristics are deteriorated by radiating its heat to the non-heated fuel F is supplied into the #3-cylinder acting as the second fuel injection cylinder and that the non-heated fuel F is supplied as it is into the #4-cylinder acting as the next third fuel injection cylinder. Accordingly, there is a possibility that the internal combustion engine cannot be started in a low temperature state because a faulty ignition, a misfire, and the like occur.

To cope with the above problem, in this case, the drive amount of the feed pump 52 is reduced so that the non-heated fuel F is not injected from the third fuel injection valve 54c and the fourth fuel injection valve 54d. That is, when the #1-cylinder acts as the first fuel injection cylinder at the low temperature start, the map data is set so that the fuel feed amount from the feed pump 52 is reduced by setting the drive amount of the feed pump 52 to a small amount. With this arrangement, at step ST14 in this case, since the drive amount of the feed pump 52 is reduced, a supply amount of the non-heated fuel F into the fuel delivery pipe 53 is reduced.

Accordingly, in this case, since the heated fuel F is injected from the third fuel injection valve 54c of the #3-cylinder, which executes the fuel injection operation second, and from the fourth fuel injection valve 54d of the #4-cylinder, which executes the fuel injection operation third, a good low temperature start property can be obtained by avoiding the faulty ignition, the misfire, and the like. In contrast, at the time, since the non-heated fuel F is fed into the fuel delivery pipe 53 although it is a slight amount, an increase of negative pressure is suppressed in the fuel delivery pipe 53. As a result, an unintended flow of the non-heated fuel F due to the increase of the negative pressure, and a flow of a combustion gas and the like through the fuel injection valve 54 (first to fourth fuel injection valves 54a to 54d) can be prevented. Accordingly, since an injection of the unintended non-heated fuel. F at an improper timing, an injection restriction of the fuel F due to a combustion gas and the like can be avoided here, an effect of improvement of the low temperature start property obtained by the drive amount control of the feed pump 52 can be kept.

Figure 11:
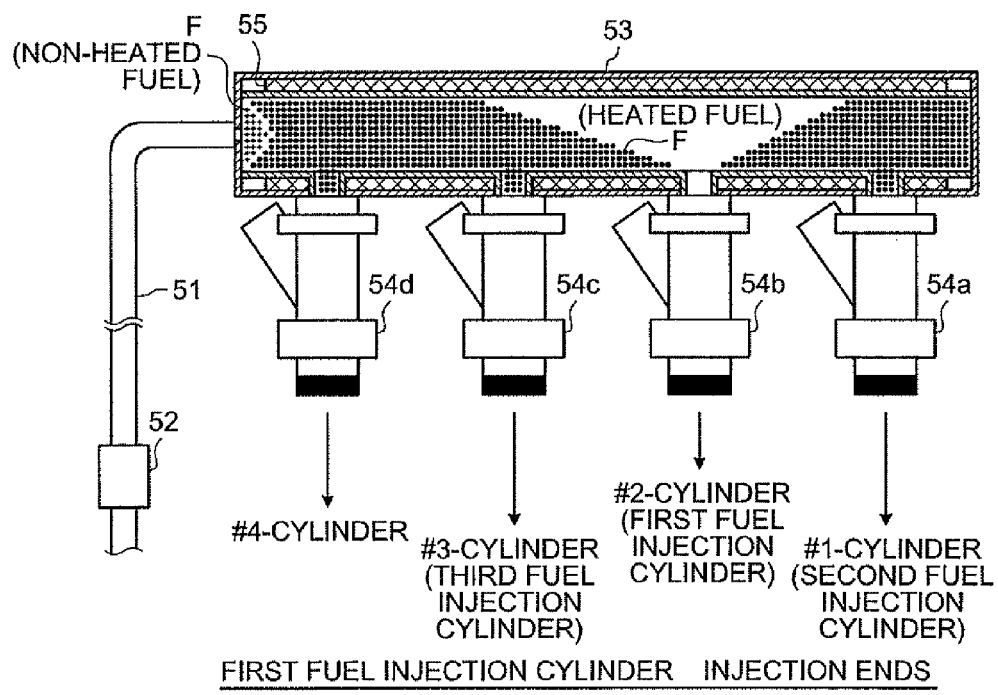
FIG. 11 is a view illustrating a state inside of the fuel delivery pipe of the second embodiment for the in-line four cylinder internal combustion engine when fuel injection to a #2-cylinder as the first fuel injection cylinder ends.

Further, when #2-cylinder acts as the first fuel injection cylinder at the low temperature start, the third fuel injection valve 54c, which is disposed near to the fuel supply port of the fuel delivery pipe 53, acts as the third fuel injection cylinder as shown in FIG. 11. Accordingly, in this case, unless the drive amount of the feed pump 52 is reduced, since there is a high possibility that the non-heated fuel F is supplied as it is into the #3-cylinder acting as the third fuel injection cylinder, there is a possibility that the internal combustion engine cannot be started in the low temperature state because the faulty ignition, the misfire, and the like occur.

To cope with the above problem, in this case, the drive amount of the feed pump 52 is reduced so that the non-heated fuel F is not injected from the third fuel injection valve 54c. That is, even when the #2-cylinder acts as the first fuel injection cylinder at the low temperature start, the map data is set so that the fuel feed amount from the feed pump 52 is reduced by setting the drive amount of the feed pump 52 to the small amount. Here, the drive amount of the feed pump 52 is reduced so that the fuel feed amount is set to the same amount as or a little larger than that when the #1-cylinder act as the first fuel injection cylinder at the low temperature start. With this arrangement, at step ST14 in this case, since the drive amount of the feed pump 52 is reduced, the supply amount of the non-heated fuel F into the fuel delivery pipe 53 is reduced.

Accordingly, in this case, since the heated fuel F is injected also from the third fuel injection valve 54c of the #3-cylinder which executes the injection operation third, the good low temperature start property can be obtained by avoiding the faulty ignition, the misfire, and the like. In contrast, at the time, since the non-heated fuel F is fed into the fuel delivery pipe 53 although it is a slight amount, the effect of improvement of the low temperature start property obtained by the drive amount control of the feed pump 52 can be kept just like when the #1-cylinder acts as the first fuel injection cylinder at the low temperature start.

Figure 12:
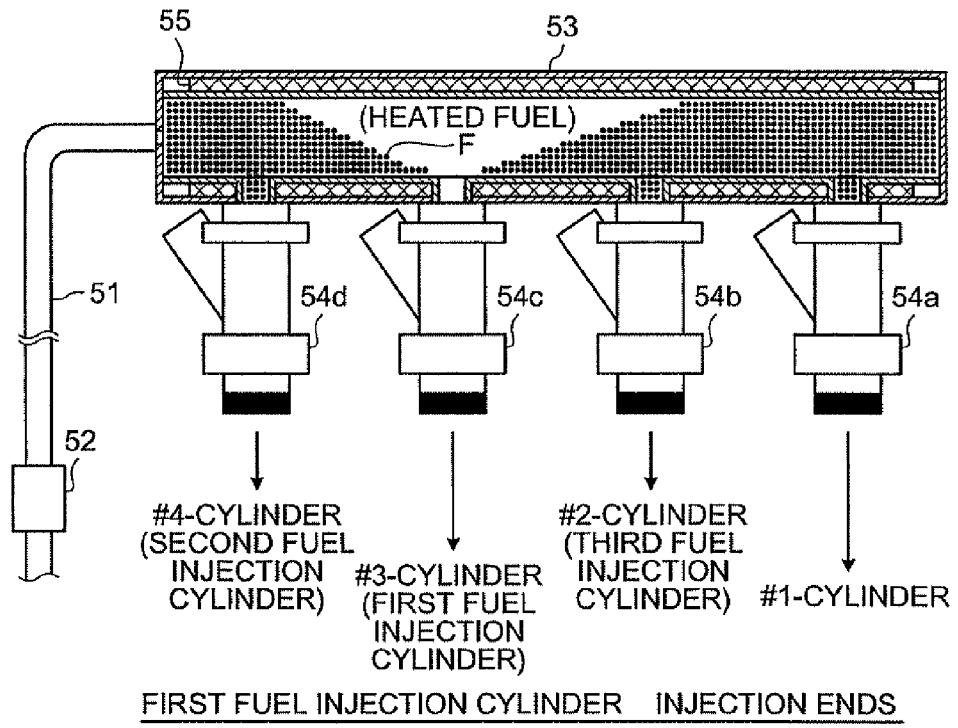
FIG. 12 is a view illustrating a state inside of the fuel delivery pipe of the second embodiment for the in-line four cylinder internal combustion engine when fuel injection to a #3-cylinder as the first fuel injection cylinder ends.

Further, when #3-cylinder acts as the first fuel injection cylinder at the low temperature start, the fourth fuel injection valve 54d, which is disposed near to the fuel supply port of the fuel delivery pipe 53, acts as the second fuel injection cylinder as shown in FIG. 12. Accordingly, in this case, unless the drive amount of the feed pump 52 is reduced, there is a very high possibility that the non-heated fuel F is supplied as it is into the #4-cylinder acting as the second fuel injection cylinder. That is, since the fourth fuel injection valve 54d of the #4-cylinder is disposed nearest to the fuel supply port of the fuel delivery pipe 53, when the non-heated fuel F is supplied into the fuel delivery pipe 53 even in a slight amount, the fourth fuel injection valve 54d injects the non-heated fuel F. Accordingly, in the internal combustion engine at the time, there is a possibility that the internal combustion engine cannot be started in the low temperature state because the faulty ignition, the misfire, and the like occur.

To cope with the above problem, in this case, the drive amount of the feed pump 52 is reduced as much as possible so that the non-heated fuel F is not injected from the fourth fuel injection valve 54d. That is, when the #3-cylinder acts as the first fuel injection cylinder at the low temperature start, the map data is set so that almost no fuel is fed from the feed pump 52 by setting the drive amount of the feed pump 52 as small as possible. The feed pump 52 is prevented from feeding the non-heated fuel F by stopping the feed pump 52 here. With this arrangement, at step ST14 in this case, since the drive of the feed pump 52 is stopped, the supply of the non-heated fuel F into the fuel delivery pipe 53 is stopped.

Accordingly, in this case, since the heated fuel F is injected also from the fourth fuel injection valve 54d of the #4-cylinder which executes the injection operation second, the good low temperature start property can be obtained by avoiding the faulty ignition, the misfire, and the like. The negative pressure is generated here because the non-heated fuel F is not supplied into the fuel delivery pipe 53 at the time. However, more stress is put on avoidance of the misfire and the like caused by the non-heated fuel F supplied into the #4-cylinder acting as the second fuel injection cylinder. Note that it is preferable to cause the fuel pump control means in this case to drive the feed pump 52 when the fuel injection of the fourth fuel injection valve 54d ends and to supply the non-heated fuel F into the fuel delivery pipe 53. With this operation, since a further increase of the negative pressure is prevented, the improved low temperature start property is kept.

Figure 13:
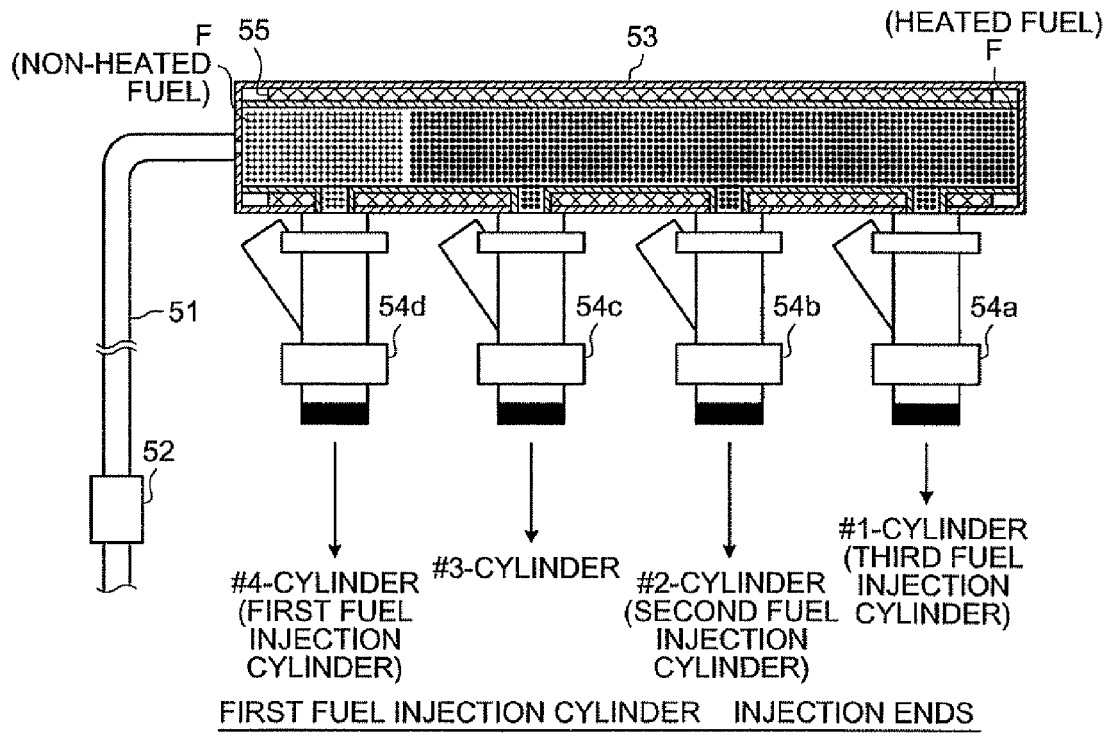
FIG. 13 is a view illustrating a state inside of the fuel delivery pipe of the second embodiment for the in-line four cylinder internal combustion engine when fuel injection to a #4-cylinder as the first fuel injection cylinder ends.

In contrast, when the #4-cylinder acts as the first fuel injection cylinder at the low temperature start, as shown in FIG. 13, the injection operation is executed in a sequence of from the #4-cylinder to the #1-cylinder through the #2-cylinder. Thus, there is a small possibility that the low temperature start property is deteriorated even if the drive amount of the feed pump 52 is not adjusted because the heated fuel F is supplied into the respective cylinders. Accordingly, in this case, the drive amount of the feed pump 52 is set so that it is not reduced and the map data is set so that the fuel feed amount from the feed pump 52 does not change (in other words, a maximum fuel feed amount or a fuel feed amount near to it is obtained). That is, at step ST14 in this case, since the non-heated fuel F is ordinarily supplied into the fuel delivery pipe 53, the non-heated fuel F is replenished in the amount corresponding to the injection amount of the heated fuel F injected from the fourth fuel injection valve 54d of the #4-cylinder. Accordingly, at the time, since the negative pressure in the fuel delivery pipe 53 does not increase, an unintentional flow of the non-heated fuel F caused by the increase of the negative pressure and a flow of the combustion gas and the like through the fuel injection valves 54 (first to fourth fuel injection valves 54a to 54d) can be prevented. As a result, the effect of improvement of the low temperature start property obtained by the drive amount control of the feed pump 52 can be continuously kept.

As shown above, the fuel injection controlling apparatus of the second embodiment can inject only the heated fuel F by preventing an injection of the non-heated fuel F and a temperature reduction of the heated fuel F caused by the non-heated fuel F at the low temperature start. Further, at the time, the fuel injection controlling apparatus prevents the increase of the negative pressure in the fuel delivery pipe 53 by adjusting the supply amount of the non-heated fuel F according to the first fuel injection cylinder. As a result, the effect of improvement of the start property at the low temperature start can be more improved than the first embodiment.

Incidentally, although the heating means 55 is disposed to the fuel delivery pipe 53 also in the second embodiment as with the first embodiment, the heating means 55 may be disposed on the fuel path 51 downstream of the feed pump 52. In this case, since the heated fuel F exists downstream of the heating means 55 in the fuel path 51, when the feed pump 52 is driven, the heated fuel F existing in the fuel path 51 flows into the fuel delivery pipe 53. Accordingly, in this case, the fuel feed amount from the feed pump 52 may be increased than that of the above-mentioned example according to an existing amount of the heated fuel F (in other words, according to a path length downstream of the heating means 55 in the fuel path 51). With this operation, the increase of the negative pressure in the fuel delivery pipe 53 can be further suppressed.

The first and second embodiments described above are exemplified assuming that an alcohol concentration of the fuel F is fixed. However, it is preferable to provide the fuel injection controlling apparatus (electronic control unit 1) of the first and second embodiments with an alcohol concentration detection means for detecting an alcohol concentration and with an alcohol concentration estimation means for estimating an alcohol concentration in consideration that the fuel F having a different alcohol concentration is supplied. The alcohol concentration detection means and the alcohol concentration estimation means are made by a known technique in the art and make use of a value detected by an alcohol concentration sensor, fuel property information when the fuel is supplied, an oxygen concentration in an exhaust gas, and the like. In this case, whether or not the heat operation of the fuel F executed by the heating means 55 (heating means 155) is necessary is determined according to the alcohol concentration. For example, the fuel F having a higher alcohol concentration can be more easily heated by the heating means 55.

Third Embodiment

Next, a third embodiment of the fuel injection controlling apparatus of the internal combustion engine according to the present invention will be explained based on FIG. 1, FIG. 2, FIG. 6, and FIG. 14 to FIG. 17. It is assumed that the fuel injection controlling apparatus of the third embodiment is prepared as a function of an electronic control unit 1 as with the first embodiment. Further, in the third embodiment, the fuel injection controlling apparatus will be explained using the in-line four cylinder internal combustion engine exemplified in the first embodiment.

Since FIG. 2 shows a state before the engine starts and before the fuel F is injected, when the engine is started by an alcohol fuel or an alcohol-mixed fuel at low temperature, the fuel F in a fuel delivery pipe 53 whose state is shown in FIG. 2 is heated by a heating means 55 as explained also in the first embodiment. Accordingly, even if any cylinder from a #1-cylinder to a #4-cylinder acts as a first fuel injection cylinder when the engine starts, the heated fuel F is injected from a fuel injection valve (any one of the first to fourth fuel injection valves 54a to 54d) of the first fuel injection cylinder.

In contrast, the heated fuel F which originally exists in the fuel delivery pipe 53 may be injected or the non-heated fuel F which is replenished from a fuel path 51 as the heated fuel F is injected may be injected from a fuel injection valve which executes an injection operation second and third at a low temperature start although this depends on a fuel injection sequence of respective fuel injection valves (first to fourth fuel injection valves 54a to 54d).

For example, it is assumed that the internal combustion engine exemplified in the third embodiment executes a fuel injection in a sequence of from the #1-cylinder to the #2-cylinder through the #3-cylinder and the #4-cylinder. In this case, when, for example, the #1-cylinder acts as the first fuel injection cylinder, the #3-cylinder acts as a second fuel injection cylinder, and further the #4-cylinder acts as a third fuel injection cylinder, and the non-heated fuel F replenished from the fuel path 51 is supplied into the #4-cylinder. At the time, the non-heated fuel F may be supplied into the #3-cylinder acting as the second fuel injection cylinder in place of the heated fuel F depending on a fuel injection amount of the first fuel injection valve 54a of the #1-cylinder and on a fuel storage volume in the fuel delivery pipe 53. It is assumed here that the heated fuel F is supplied into the #3-cylinder. Accordingly, when a necessary number of times of ignition of the heated fuel F required at minimum (hereinafter, called "minimum necessary number of times of ignition"), which is necessary to stably start the internal combustion engine at the low temperature, is three times, there is a high possibility that a faulty ignition such as a misfire is caused. In contrast, when the minimum necessary number of times of ignition is two times, the engine can be stably started at the low temperature.

Further, when the #2-cylinder acts as the first fuel injection cylinder, the heated fuel F is supplied into the #1 cylinder acting as the second fuel injection cylinder. There is a high possibility that the non-heated fuel F is supplied into the #3-cylinder acting as the third fuel injection cylinder at the time although this depends on fuel injection amounts of the first and second fuel injection valves 54a, 54b of the #1-cylinder and the #2-cylinder and on the fuel storage volume in the fuel delivery pipe 53. It is assumed here that the non-heated fuel F is supplied into the #3-cylinder. Accordingly, the internal combustion engine at the time can execute a stable low temperature start when the minimum necessary number of times of ignition is two times, whereas when the minimum necessary number of times of ignition is three times, there is a high possibility that the faulty ignition such as the misfire is caused.

Further, when the #3-cylinder acts as the first fuel injection cylinder, the #4-cylinder acts as the second fuel injection cylinder, and the non-heated fuel F in the fuel path 51, which is replenished by the fuel injection into the #3-cylinder, is injected from the fourth fuel injection valve 54d of the #4-cylinder. Accordingly, there is a high possibility that the internal combustion engine at the time causes the faulty ignition such as the misfire even if the minimum necessary number of times of ignition is two times or three times.

Different from what has been described above, when the #4-cylinder acts as the first fuel injection cylinder, since the #2-cylinder and the #1-cylinder act as the second fuel injection cylinder and third fuel injection cylinder, respectively, there is a high possibility that the heated fuel F is injected into any of the cylinders although this depends on fuel injection amounts of the first, second and fourth fuel injection valves 54a, 54b, 54d of these cylinders and on the fuel storage volume in the fuel delivery pipe 53. Accordingly, the internal combustion engine at the time can execute the stable low temperature start even if the minimum necessary number of times of ignition is two times or three times.

As described above, whether a low temperature start property is good or bad changes depending on which fuel injection valve is used as a fuel injection valve of the first fuel injection cylinder (hereinafter, called "start fuel injection valve"). The start fuel injection valve at the low temperature start is different according to at least a fuel injection sequence of the respective fuel injection valves (first to fourth fuel injection valves 54a to 54d), fuel injection amounts of the respective fuel injection valves, the fuel storage volume in the fuel delivery pipe 53, and the minimum necessary number of times of ignition described above.

The fuel injection sequence, the fuel injection amounts, and the fuel storage volume in the fuel delivery pipe 53 are previously set as inherent values of the engine and do not change. Different from what has been described above, the minimum necessary number of times of ignition changes according to an external temperature, a suction temperature, a cooling water temperature, a difference of in-cylinder temperatures, and the like at the low temperature start. Accordingly, to improve the low temperature start property, it is sufficient to change a fuel injection valve to be used as the start fuel injection valve according to the minimum necessary number of times of ignition at the time.

Thus, the fuel injection controlling apparatus (electronic control unit 1) of the third embodiment is provided with a minimum necessary number of times of ignition calculation means for determining a minimum necessary number of times of ignition based on at least one of the external temperature, the suction temperature, the cooling water temperature, and the in-cylinder temperatures and with a start fuel injection valve setting means for setting the start fuel injection valve suitable for improving the low temperature start property based on the minimum necessary number of times of ignition.

Further, the fuel injection controlling apparatus (the electronic control unit 1) of the third embodiment is provided also with a fuel injection control means for controlling the set start fuel injection valve (hereinafter, also called "set start fuel injection valve") so that the fuel injection is started from the set start fuel injection valve at the low temperature start. For example, the fuel injection control means of the third embodiment prohibits the fuel injection until the set start fuel injection valve agrees with a fuel injection valve as an injection control target, and when they agree with each other, the fuel injection control means causes the set start fuel injection valve to start the fuel injection. That is, when an fuel injection timing of a different fuel injection valve is reached earlier than the set start fuel injection valve at the low temperature start, the fuel injection control means prohibits a fuel injection operation of the different fuel injection valve whose fuel injection timing is reached earlier.

Figure 14:
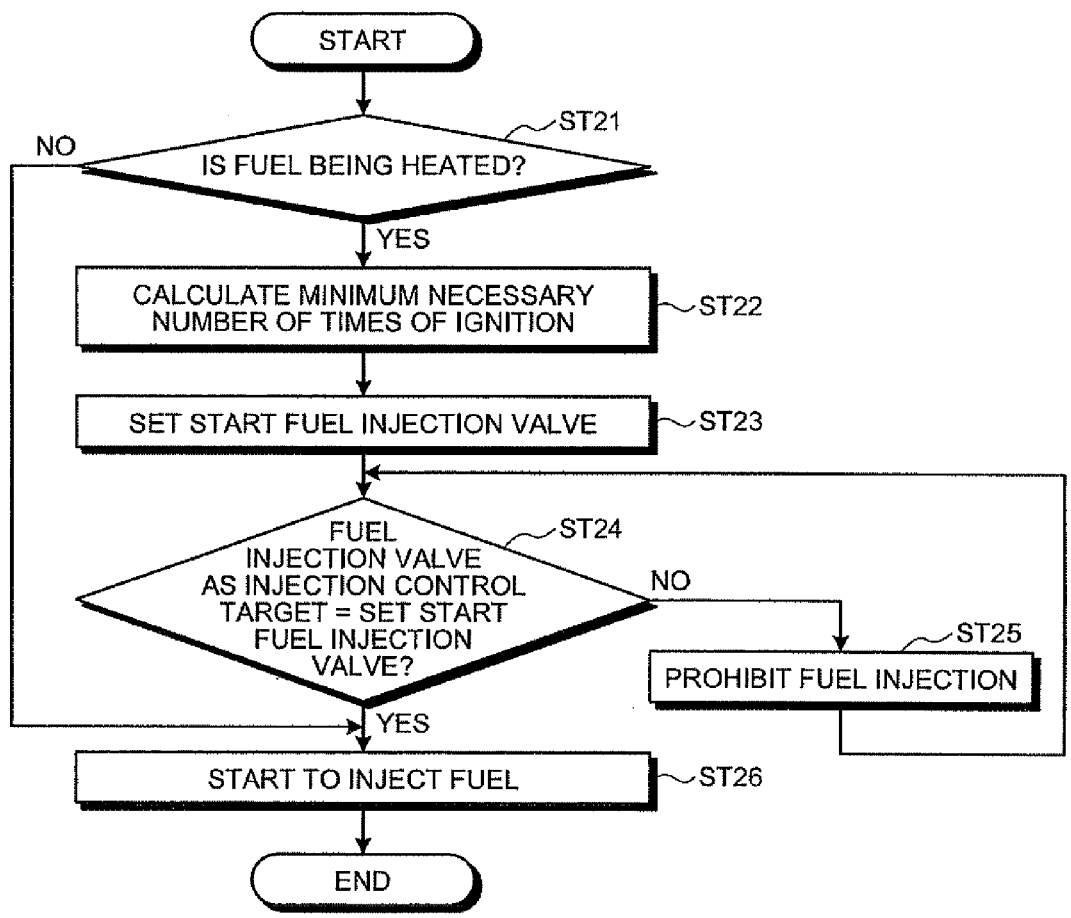
FIG. 14 is a flowchart explaining a control operation executed by a fuel injection controlling apparatus of a third embodiment at a low temperature start.

Specifically, the electronic control unit 1 (fuel injection controlling apparatus) of the third embodiment determines whether or not a heat operation to the fuel F is executed by the heating means 55 when the engine is started as shown in a flowchart of FIG. 14 (step ST21). The determination can be made by observing whether the fuel heat control means of the electronic control unit 1 instructs an ON operation or an OFF operation to the heating means 55.

Unless the heat operation is executed, the fuel injection control means of the electronic control unit 1 goes to step ST26 to be described later and controls the drive of the start fuel injection valve (any one of the first to fourth fuel injection valves 54a to 54d) at the time so that the fuel injection valve injects the fuel F. Note that the feed pump 52 is previously driven here.

In contrast, when the heat operation is being executed by the heating means 55, the electronic control unit 1 of the third embodiment causes the minimum necessary number of times of ignition calculation means to calculate a minimum necessary number of times of ignition at the low temperature start of this time (step ST22). The minimum necessary number of times of ignition is derived from predetermined map data by, for example, matching a cooling water temperature detected by the water temperature sensor 17 shown in FIG. 1 to the map data. The map data is prepared by previously determining a correspondence relation between the cooling water temperature and the minimum necessary number of times of ignition by an experiment and a simulation.

The electronic control unit 1 causes the start fuel injection valve setting means to set the start fuel injection valve suitable for improving the low temperature start property based on the minimum necessary number of times of ignition determined at step ST22 described above (step ST23).

The setting is executed referring to map data which uses the minimum necessary number of times of ignition and the start fuel injection valve suitable for improving the low temperature start property as parameters. The map data is prepared by previously executing an experiment and a simulation. When, for example, the minimum necessary number of times of ignition is two times, any of the first fuel injection valve 54a of the #1-cylinder, the second fuel injection valve 54b of the #2-cylinder, and the fourth fuel injection valve 54d of the #4-cylinder is applied to the map data as the start fuel injection valve for improving the low temperature start property as described above. Further, the fourth fuel injection valve 54d of the #4-cylinder is set to the map data as the start fuel injection valve when the minimum necessary number of times of ignition is three times.

Thereafter, the fuel injection control means of the electronic control unit 1 determines whether or not the fuel injection valve, which is used by the fuel injection control means at the time as the injection control target, is the set start fuel injection valve at step ST23 (step ST24).

When the fuel injection control means determines that the fuel injection valve as the injection control target does not agree with the set start fuel injection valve, the fuel injection control means prohibits the fuel injection from the fuel injection valve as the injection control target (step ST25). The fuel injection prohibiting operation executed here is repeated until the fuel injection valve as the injection control target agrees with the set start fuel injection valve. That is, although a crank shaft 15 is rotated by a cranking operation executed by a not shown starter motor, no fuel is supplied until the fuel injection valve as the injection control target reaches the set start fuel injection valve.

In contrast, when the fuel injection control means determines at step ST24 that the fuel injection valve as the injection control target agrees with the set start fuel injection valve, the fuel injection control means starts the fuel injection operation using the fuel injection valve of the injection control target as the set start fuel injection valve as a start point (step ST26).

Figure 15:
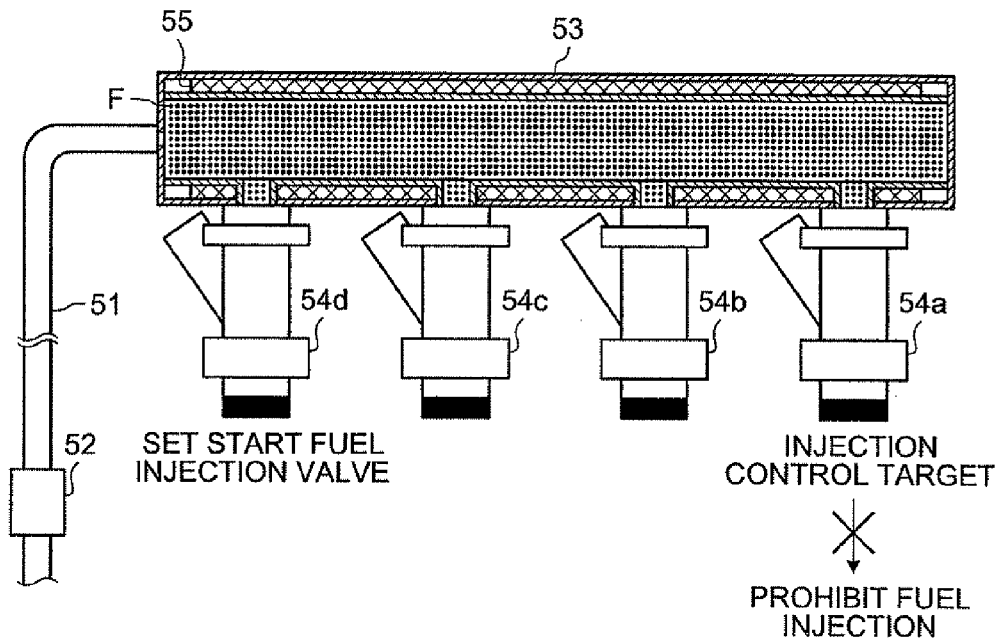
FIG. 15 is a view illustrating an example of a fuel injection control operation at a low temperature start in the third embodiment and shows a fuel injection prohibited state.

It is assumed here, for example, that the minimum necessary number of times of ignition is three times and the fourth fuel injection valve 54*d* is set as the set start fuel injection valve as shown in FIG. 15. When the fuel injection valve as the injection control target at the time is the first fuel injection valve 54*a*, the fuel injection control means determines NO at step ST24 and goes to step ST5 and prohibits the fuel injection operation of the first fuel injection valve 54*a* as shown in FIG. 15. At the time, the feed pump 52 may be kept in a drive state or may be stopped once. Thereafter, since the third fuel injection valve 54*c* of the #3-cylinder is used as a next fuel injection valve as the injection control target, the fuel injection control means also prohibits the fuel injection operation of the third fuel injection valve 54*c*.

Figure 16:
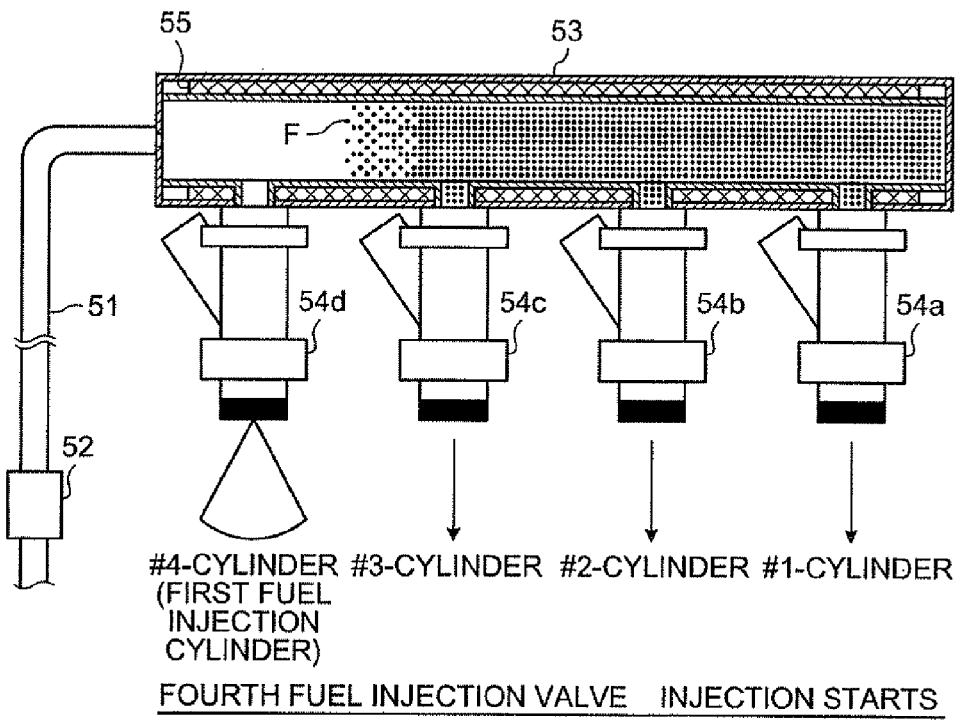
FIG. 16 is a view illustrating an example of a fuel injection control operation at low temperature start in the third embodiment and shows a state when fuel injection is started by a start fuel injection valve.

Further, in a fuel injection valve as a next injection control target, since the fuel injection is executed in a sequence of from the #1-cylinder to the #2-cylinder through the #3-cylinder and the #4-cylinder, the fourth fuel injection valve 54*d* of the #4-cylinder is used as the fuel injection valve. Accordingly, the fuel injection control means determines YES at step ST24 and goes to step ST26 and controls the drive of the fourth fuel injection valve 54*d* so that it injects the heated fuel F as shown in FIG. 16.

Figure 17:
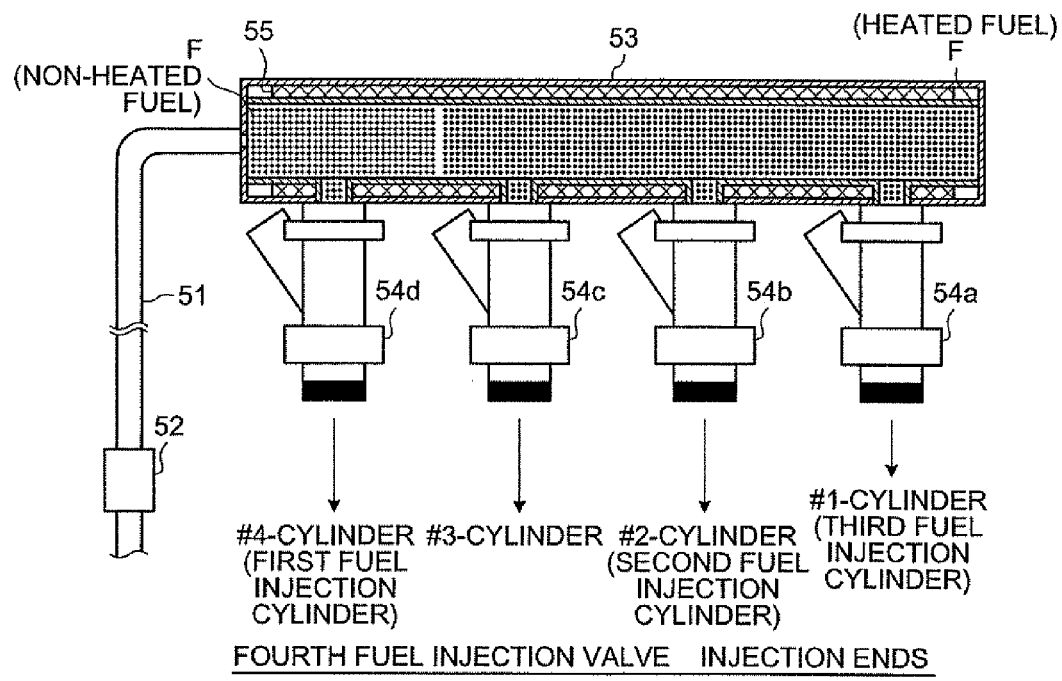
FIG. 17 is a view illustrating an example of a fuel injection control operation at low temperature start in the third embodiment and shows a state after fuel injection is ended by the start fuel injection valve.

After the completion of the fuel injection executed by the fourth fuel injection valve 54*d*, the non-heated fuel F is replenished into the fuel delivery pipe 53 from the fuel path 51 as shown in FIG. 17. However, at the time, as shown in FIG. 17, since the heated fuel F in the fuel delivery pipe 53 is supplied into the second fuel injection valve 54*b* and to the first fuel injection valve 54*a* which are sequentially used as the injection control target, the heated fuel F can be injected from the second fuel injection valve 54*b* and the first fuel injection valve 54*a*. That is, in the internal combustion engine at the low temperature start, the heated fuel F is continuously supplied three times in a sequence of from the #4-cylinder to the #1-cylinder through the #2-cylinder. Accordingly, in the internal combustion engine, since ignition and combustion are continuously repeated three times, which satisfy the minimum necessary number of times of ignition at the low temperature start, a stable combustion operation can be continued also thereafter.

As shown above, in the fuel injection controlling apparatus of the third embodiment, the injection operation of all the fuel injection valves is stopped until the injection timing of the set start fuel injection valve is reached at the low temperature start. Accordingly, the respective fuel injection valves are caused to inject the heated fuel F at least the minimum necessary number of times of ignition using the set start fuel injection valve as a start point so that the heated fuel F can be supplied into relevant cylinders. Accordingly, since the fuel injection controlling apparatus can operate the internal combustion engine by the heated fuel F at least as many times as the minimum necessary number of times of ignition at the low temperature start, the start property at the low temperature start can be improved when an alcohol fuel or an alcohol-mixed fuel are used.

Incidentally, the fourth fuel injection valve 54*d* of the #4-cylinder of the internal combustion engine exemplified here can be caused to act as the start fuel injection valve even if the minimum necessary number of times of ignition is two times and three times. Accordingly, in the third embodiment, the fourth fuel injection valve 54*d* (that is, the fuel injection valve nearest to the fuel supply port of the fuel delivery pipe 53) may be previously set as the start fuel injection valve.

Further, although the in-line four cylinder internal combustion engine is exemplified above, the fuel injection controlling apparatus of the third embodiment described above can be applied also to an internal combustion engine whose type is different from that of the above engine. Explanation will be made here exemplifying, for example, a V-type six cylinder internal combustion engine. The internal combustion engine is the engine explained in the first embodiment in which the fuel injection is executed in a sequence of from the #1-cylinder to the #6-cylinder through the #2-cylinder, the #3-cylinder, the #4-cylinder, and the #5-cylinder (FIG. 6).

Also in the V-type six cylinder internal combustion engine, when the fuel F is heated by respective heating means 155, the electronic control unit 1 (fuel injection controlling apparatus) stops the injection operation of all the fuel injection valves until the injection timing of the set start fuel injection valve is reached so that an ignition operation to the heated fuel F is continuously executed at least the minimum necessary number of times of ignition.

For example, it is sufficient to set a set start fuel injection valve of the V-type six cylinder internal combustion engine as described below. Note that it is assumed here that a total injection amount of first to sixth fuel injection valves 154*a* to 154*f* is approximately equal to a fuel storage volume in a fuel delivery pipe 153.

First, when the #1-cylinder acts as a first fuel injection cylinder, the heated fuel F can be supplied up to at least the #2-cylinder and the #3-cylinder. Accordingly, the first fuel injection valve 154*a* of the #1-cylinder can be set as the set start fuel injection valve when the minimum necessary number of times of ignition is two times and three times.

Further, when the #2-cylinder acts as the first fuel injection cylinder, the heated fuel F can be supplied up to at least only the next #3-cylinder. Accordingly, the second fuel injection valve 154*b* of the #2-cylinder can be set as the set start fuel injection valve only when the minimum necessary number of times of ignition is two times.

Further, when the #3-cylinder acts as the first fuel injection cylinder, the heated fuel F can be supplied up to at least the #4-cylinder and the #5-cylinder. Accordingly, the third fuel injection valve 154*c* of the #3-cylinder can be set as the set start fuel injection valve when the minimum necessary number of times of ignition is two times and three times.

Further, when the #4-cylinder acts as the first fuel injection cylinder, the heated fuel F can be supplied up to at least only the next #5-cylinder. Accordingly, the fourth fuel injection valve 154*d* of the #4-cylinder can be set as the set start fuel injection valve only when the minimum necessary number of times of ignition is two times.

Further, when the #6-cylinder acts as the first fuel injection cylinder, the heated fuel F can be supplied up to at least the next #1- to #3-cylinders. Accordingly, when the minimum necessary number of times of ignition is two times and three times and further when it is four times, the sixth fuel injection valve 154*f* of the #6-cylinder can be set as the set start fuel injection valve.

Note that when the #5-cylinder acts as the first fuel injection cylinder, the non-heated fuel F is injected from the sixth fuel injection valve 154*f* of the next #6-cylinder. Accordingly, the fifth fuel injection valve 154*e* of the #5-cylinder cannot be set as the set start fuel injection valve.

Incidentally, the sixth fuel injection valve 154*f* of the #6-cylinder of the V-type six cylinder internal combustion engine can be caused to act as the start fuel injection valve even when the minimum necessary number of times of ignition is two times and three times, and further even when it is four times. Accordingly, in the third embodiment, the sixth fuel injection valve 154f (that is the fuel injection valve nearest to the fuel supply port of the fuel delivery pipe 153) may be previously set as the start fuel injection valve.

Fourth Embodiment

Next, a fourth embodiment of the fuel injection controlling apparatus of the internal combustion engine according to the present invention will be explained. It is assumed that the fuel injection controlling apparatus of the fourth embodiment is prepared as a function of an electronic control unit 3 as with the third embodiment.

In the third embodiment described above, to start the fuel injection using the set start fuel injection valve as a start point at a low temperature start, the fuel injection of other fuel injection valves is prohibited until the set start fuel injection valve is actually used as a fuel injection valve as the injection control target.

However, when, for example, a cylinder according to the set start fuel injection valve finished its operation in a suction stroke at the time the engine stopped previously as described above, since a time is necessary until the set start fuel injection valve is actually used as the fuel injection valve as the injection control target, a cranking time increases and a power consumption of a not shown battery is increased. The power consumption is more increased as the number of the cylinders of the internal combustion engine more increases.

Thus, in the fourth embodiment, to start a cylinder according to the set start fuel injection valve from a suction stroke when the engine starts, a stop position of a piston of the cylinder is controlled when the engine stops. Accordingly, a fuel injection controlling apparatus (electronic control unit 1) of the fourth embodiment is prepared with an engine stop control means for controlling a stop position of the piston when the engine stops. Accordingly, the fuel injection control means of the fourth embodiment can execute a fuel injection using the set start fuel injection valve as the start point at the low temperature start.

In the fourth embodiment, the set start fuel injection valve is previously set as a predetermined set start fuel injection valve. For example, in the in-line four cylinder internal combustion engine exemplified in the third embodiment, since the fuel injection valve can be caused to act as the start fuel injection valve even if the minimum necessary number of times of ignition is two times and three times, it is sufficient to previously set the fourth fuel injection valve 54d of the #4-cylinder as the start fuel injection valve. Further, in the V-type six cylinder internal combustion engine exemplified in the third embodiment, since the fuel injection valve can be caused to act as the start fuel injection valve even if the minimum necessary number of times of ignition is two times, three times, and four times, it is sufficient to previously set the sixth fuel injection valve 154f of the #6-cylinder as the start fuel injection valve. That is, the fuel injection valves (fourth fuel injection valve 54d, sixth fuel injection valve 154f) nearest to the fuel supply ports of the fuel delivery pipes 53, 153 are set as the start fuel injection valves.

Specifically, the engine stop control means of the fourth embodiment executes an engine stop operation to stop the engine when the piston 13 of the cylinder according to the set start fuel injection valve, which is previously set, is in an exhaust stroke (preferably near to an end of the exhaust stroke). The engine stop control means is arranged by a method and a mechanism known in the art, and, it is sufficient to use, for example, the technique of Patent Document 3 described above.

As described above, the fuel injection controlling apparatus of the fourth embodiment previously executes the engine stop control so that the cylinder according to the set start fuel injection valve starts in the suction stroke when the engine starts next. Accordingly, respective fuel injection valves are caused to inject the heated fuel F as many times as at least the minimum necessary number of times of ignition using the set start fuel injection valve as the start point at the low temperature start so that the heated fuel F can be supplied into relevant cylinders. Accordingly, since the fuel injection controlling apparatus can operate the internal combustion engine by the heated fuel F at least the minimum necessary number of times of ignition at the low temperature start as with the third embodiment, a start property at a low temperature start can be improved when an alcohol fuel or an alcohol-mixed fuel are used. Further, since the fuel injection controlling apparatus of the fourth embodiment can start an injection of the heated fuel F at an early stage of a cranking operation at the low temperature start, a power consumption of a battery caused by the cranking operation can be suppressed.

Incidentally, in the in-line four cylinder internal combustion engines of the third and fourth embodiments described above, the heating means 55 is disposed to the fuel delivery pipe 53. Further, in the V-type six cylinder internal combustion engine, the heating means 155 is disposed to the fuel delivery pipe 153. However, the heating means 55, 155 may be disposed on the fuel path 51 downstream of the feed pump 52, and the same effect can be achieved even in the above arrangement. Note that, in this case, the heated fuel F exists downstream of the heating means 55, 155 in the fuel path 51.

The first to fourth embodiments described above are exemplified assuming that an alcohol concentration of the fuel F is fixed. However, it is preferable to provide the fuel injection controlling apparatus (electronic control unit 1) of the first to fourth embodiments with an alcohol concentration detection means for detecting an alcohol concentration or an alcohol concentration estimation means for estimating an alcohol concentration in consideration that the fuel F having a different alcohol concentration is supplied. The alcohol concentration detection means and the alcohol concentration estimation means are made by a known technique in the art and make use of a value detected by an alcohol concentration sensor, fuel property information when the fuel is supplied, an oxygen concentration in an exhaust gas, and the like.

In this case, whether or not the heat operation of the fuel F executed by the heating means 55 (heating means 155) is necessary is determined according to the alcohol concentration. For example, the fuel F having a higher alcohol concentration can be more easily heated by the heating means 55. Further, in the third and fourth embodiments described above, the minimum necessary number of times of ignition is set in consideration of the alcohol concentration. For example, a larger minimum necessary number of times of ignition is set to a larger alcohol concentration.

INDUSTRIAL APPLICABILITY

As described above, the fuel injection controlling apparatuses of the internal combustion engines according to the present invention are useful as a technique for making the result of improvement of the low temperature start property, which is achieved by the heated fuel, effective.

The invention claimed is:
1. A fuel injection controlling apparatus of an internal combustion engine comprising:
   a fuel pump configured to feed fuel from a fuel tank into a fuel path;

a fuel delivery pipe configured to distribute the fuel in the fuel path to respective cylinders;

fuel injection valves of the respective cylinders configured to inject the fuel supplied from the fuel delivery pipe into respective suction ports;

a heating unit disposed adjacent to the fuel delivery pipe and configured to heat the fuel in the fuel delivery pipe fed from the fuel path when the fuel has a cold start property; and a fuel pump control unit configured to stop a drive of the fuel pump until the heated fuel in the fuel delivery pipe is reduced to a predetermined amount or less so that non-heated fuel is not supplied into the fuel delivery pipe.

2. The fuel injection controlling apparatus of the internal combustion engine according to claim 1, wherein the cold start property occurs when an engine cooling water temperature is lower than a predetermined temperature.

3. A fuel injection controlling apparatus of an internal combustion engine comprising:

a fuel pump configured to feed fuel from a fuel tank into a fuel path;

a fuel delivery pipe configured to distribute the fuel in the fuel path to respective cylinders;

fuel injection valves of the respective cylinders configured to inject the fuel supplied from the fuel delivery pipe into respective suction ports;

a heating unit disposed adjacent to the fuel delivery pipe and configured to heat the fuel in the fuel delivery pipe fed from the fuel path when the fuel has a cold start property;

a first fuel injection cylinder specifying unit configured to specify a first fuel injection cylinder to which the fuel is supplied first when the engine starts; and a fuel pump control unit configured to control a fuel feed amount of the fuel pump at a low temperature start according to the specified first fuel injection cylinder.

4. The fuel injection controlling apparatus of the internal combustion engine according to claim 3, further comprising:

a non-heated fuel injection valve specifying unit configured to specify a fuel injection valve from which a non-heated fuel supplied into the fuel delivery pipe is injected, based on the first fuel injection cylinder and on an injection sequence of the respective fuel injection valves, wherein the fuel pump control unit is configured to reduce a fuel feed amount of the fuel pump as an injection timing of a non-heated fuel injected by the specified fuel injection valve is reached earlier.

5. The fuel injection controlling apparatus of the internal combustion engine according to claim 3, wherein the cold start property occurs when an engine cooling water temperature is lower than a predetermined temperature.

6. A fuel injection controlling apparatus of an internal combustion engine comprising:

a fuel pump configured to feed fuel from a fuel tank into a fuel path;

a fuel delivery pipe configured to distribute the fuel in the fuel path to respective cylinders;

fuel injection valves of the respective cylinders configured to inject the fuel supplied from the fuel delivery pipe into respective suction ports;

a heating unit disposed adjacent to the fuel delivery pipe and configured to heat the fuel in the fuel delivery pipe fed from the fuel path when the fuel has a cold start property;

a start fuel injection valve setting unit configured to set a start fuel injection valve suitable for improving a low temperature start property from the respective fuel injection valves according to a minimum necessary number of times of ignition of the heated fuel which is necessary to stably start the internal combustion engine at a low temperature start; and a fuel injection control unit configured to execute a control so that a fuel injection is started from the set start fuel injection valve.

7. The fuel injection controlling apparatus of the internal combustion engine according to claim 6, wherein the cold start property occurs when an engine cooling water temperature is lower than a predetermined temperature.

8. The fuel injection controlling apparatus of the internal combustion engine according to claim 6, wherein when a fuel injection timing of a different fuel injection valve is reached earlier than the set start fuel injection valve at a low temperature start, the fuel injection control unit prohibits a fuel injection operation of the different fuel injection valve whose fuel injection timing is reached earlier.

9. The fuel injection controlling apparatus of the internal combustion engine according to claim 6, wherein the start fuel injection valve is a fuel injection valve disposed near a fuel supply port from the fuel pump in the fuel delivery pipe.

10. The fuel injection controlling apparatus of the internal combustion engine according to claim 8, wherein the start fuel injection valve is a fuel injection valve disposed near a fuel supply port from the fuel pump in the fuel delivery pipe.

11. A fuel injection controlling apparatus of an internal combustion engine comprising:

a fuel pump configured to feed fuel from a fuel tank into a fuel path;

a fuel delivery pipe configured to distribute the fuel in the fuel path to respective cylinders;

fuel injection valves of the respective cylinders configured to inject the fuel supplied from the fuel delivery pipe into respective suction ports;

a heating unit disposed adjacent to the fuel delivery pipe and configured to heat the fuel in the fuel delivery pipe fed from the fuel path when the fuel has a cold start property;

a start fuel injection valve setting unit configured to set a start fuel injection valve suitable for improving a low temperature start property from the respective fuel injection valves according to a minimum necessary number of times of ignition of the heated fuel which is necessary to stably start the internal combustion engine at a low temperature start; and an engine stop control unit configured to control, when the engine stops, a stop position of a piston of a cylinder according to the start fuel injection valve so that the cylinder starts in a suction stroke when the engine starts.

12. The fuel injection controlling apparatus of the internal combustion engine according to claim 11, wherein the start fuel injection valve is a fuel injection valve disposed near a fuel supply port from the fuel pump in the fuel delivery pipe.

13. The fuel injection controlling apparatus of the internal combustion engine according to claim 11, wherein the cold start property occurs when an engine cooling water temperature is lower than a predetermined temperature.

* * * * *